US010051619B2

(12) United States Patent
Golitschek Edler von Elbwart et al.

(10) Patent No.: US 10,051,619 B2
(45) Date of Patent: *Aug. 14, 2018

(54) RESOURCE ASSIGNMENT FOR SINGLE AND MULTIPLE CLUSTER TRANSMISSION

(71) Applicant: Sun Patent Trust, New York, NY (US)

(72) Inventors: Alexander Golitschek Edler von Elbwart, Darmstadt (DE); Akihiko Nishio, Osaka (JP)

(73) Assignee: Sun Patent Trust, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/627,282

(22) Filed: Jun. 19, 2017

(65) Prior Publication Data

US 2017/0289977 A1    Oct. 5, 2017

Related U.S. Application Data

(63) Continuation of application No. 15/179,708, filed on Jun. 10, 2016, now Pat. No. 9,713,138, which is a
(Continued)

(30) Foreign Application Priority Data

Mar. 23, 2011 (EP) .................... 11159463

(51) Int. Cl.
*H04W 4/00* (2018.01)
*H04W 72/04* (2009.01)
*H04L 5/00* (2006.01)

(52) U.S. Cl.
CPC ........... *H04W 72/042* (2013.01); *H04L 5/001* (2013.01); *H04L 5/0044* (2013.01); *H04L 5/0094* (2013.01); *H04W 72/0446* (2013.01)

(58) Field of Classification Search
CPC ......... H04J 13/16; H04J 13/00; H04L 1/0009; H04L 1/1822; H04L 1/0003;
(Continued)

(56) References Cited

U.S. PATENT DOCUMENTS

2009/0003274 A1  1/2009  Kwak et al.
2011/0013615 A1  1/2011  Lee et al.
2014/0029537 A1  1/2014  Golitschek Edler von Elbwart et al.

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)," Dec. 2009, 83 pages.
(Continued)

*Primary Examiner* — Yemane Mesfin
*Assistant Examiner* — Abdelillah Elmejjarmi
(74) *Attorney, Agent, or Firm* — Seed IP Law Group LLP

(57) ABSTRACT

This invention concerns concepts for signaling resource allocation information to a terminal that indicates to the terminal assigned resources for the terminal. The terminal can receives downlink control information (DCI), which comprises a field for indicating the resource allocation information of the terminal. This resource assignment field within the DCI has a predetermined number of bits. The terminal can determines its assigned resource allocation information from the content of the received DCI, even though the bit size of the resource allocation field in the received DCI is insufficient to represent all allowed resource allocations. According to an embodiment, the received bits that are signaled to the terminal in the DCI represent predetermined bits of the resource allocation information. All remaining one or more bits of the resource allocation information that are not included in the field of the received DCI are set to predetermined value.

17 Claims, 9 Drawing Sheets

Related U.S. Application Data continuation of application No. 14/006,095, filed as application No. PCT/EP2012/001039 on Mar. 8, 2012, now Pat. No. 9,392,594.

(58) Field of Classification Search
CPC .. H04L 5/0094; H04L 5/001; H04W 72/0413; H04W 72/085; H04W 72/042
See application file for complete search history.

(56) References Cited

OTHER PUBLICATIONS

ETSI TS 136 211 V10.0.0, "LTE; Evolved Universal Terrestrial Radio Access (E-UTRA); Physical channels and Modulation (3GPP TS 36.211 version 10.0.0 Release 10)," Jan. 2011, 104 pages.
ETSI TS 136 212 V10.0.0, "LTE; Evolved Universal Terrestrial Radio Access (E-UTRA);.Multiplexing and channel coding (3GPP TS 36.212 version 10.0.0 Release 10)," Jan. 2011, 74 pages.
ETSI TS 136 213 V10.0.1, "LTE; Evolved Universal Terrestrial Radio Access (E-UTRA); Physical layer procedures (3GPP TS 36.213 version 10.0.1 Release 10)," Jan. 2011, 84 pages.
Extended European Search Report dated Aug. 1, 2011, for corresponding EP Application No. 11159463.6-2412, 3 pages.
International Search Report dated Apr. 20, 2012, for corresponding International Application No. PCT/EP2012/001039, 2 pages.
Iwai et al., "System performance of Clustered DFT-S-OFDM considering allowable maximum transmit power," IEICE B-5-7, p. 361, 2010.
Iwai et al., "Required number of clusters on a non-contiguous resource allocation for LTE-Advanced uplink," IEICE B-5-8, p. 440, 2010.
Iwai et al., "System Performance of Clustered DFT-S-OFDM Considering Maximum Allowable Transmit Power," IEEE ICC 2011 Proceedings, 5 pages.

RESOURCE ASSIGNMENT FOR SINGLE AND MULTIPLE CLUSTER TRANSMISSION

BACKGROUND

Technical Field

The invention generally relates to the signaling of resource allocation information to a terminal of a mobile communication system for assigning resources to the terminal. In particular, the invention relates to the signaling of resource allocations using downlink control information for single-cluster and multi-cluster allocations in 3GPP LTE or 3GPP LTE-A. More specifically, one aspect of the invention provides a concept for signaling resource allocation information for cases where the number of available bits within the downlink control information is insufficient to represent all possible resource allocations that are supported by the system, for example, all allowed combinations of single-cluster or multi-cluster allocations. In principle, the disclosed invention can be applied to the signaling of uplink resource allocation information and downlink resource allocation information, while additional advantages are achieved with regard to certain configuration of uplink resource allocations in 3GPP LTE or 3GPP LTE-A.

Description of the Related Art

In mobile communication systems, a base station assigns downlink resources to a terminal, which the base station can use for downlink transmissions to said terminal, and/or assigns uplink resources to a terminal, which said terminal can use for uplink transmissions. The downlink and/or uplink resource allocation (or assignment) is signaled from the base station (or another related network device) to the terminal. The downlink and/or uplink resource allocation information is typically signaled as part of a downlink control information having multiple predefined flags and/or predefined fields, one of which being a field dedicated for signaling the resource allocation information.

Typically, the available number of bits that can be used to signal the resource assignment information to the terminals is predetermined by a technical specification. For example, technical specification defines the size and format of the downlink control information within which the resource assignment information is transmitted to the terminals.

Likewise, the resource allocations, or the size of the resource allocations are predetermined by a technical specification. Moreover, assignment of the uplink or downlink resources to the terminals is typically defined and given by a technical specification. For example, the uplink resources can be expressed as resource blocks, meaning that the granularity on which a user or terminal can be allocated uplink resources is the number and the position of the assignable uplink resource blocks. In this case, the technical specification typically defines the allowed combinations of resource blocks that are supported by the mobile communication system. Since the allowed resource allocations, the size of the resource allocations or the supported combinations of assignable resources are defined or predetermined, the number of bits that is required to denote all supported (combinations of) resource(s) is effectively given.

Therefore, neither the available number of bits that can be used to signal the resource assignment information nor the required number bits to denote the supported (combinations of) resource(s) can freely be chosen.

The present invention has recognized that situations can occur, in which the number of bits that is available for signaling the resource assignment information is insufficient to represent all possible resource assignments that are supported by the communication system.

The general concepts of the invention are described below in regard to 3GPP LTE and LTE-A communication systems and particularly for multiple cluster allocations specified in 3GPP LTE(-A). However, it is to be understood that the reference to 3GPP LTE and LTE-A is only an example according to specific embodiments of the invention but the general concepts of the invention can be applied to different resource allocation processes of different communication systems.

The disclosed embodiments of the invention for signaling uplink resource information to a terminal can be applied to the signaling of downlink resource information without departing from the invention. For example, the downlink resources according to LTE(-A) are assigned by the scheduler as resource blocks (RB) as the smallest possible unit of resources. The downlink component carrier (or cell) is subdivided in the time-frequency domain in sub-frames, which are each divided into two downlink slots for signaling control channel region (PDCCH region) and OFDM symbols. As such, the resource grid as illustrated in FIG. 3 for uplink resources in LTE(-A) has the same structure for downlink resources. Therefore, the signaling of allocated downlink resources with fewer bits that would be required to express all allowed resource block allocations that are supported by the communication system can be achieved in the same manner as suggested herein with regard to downlink resources.

Moreover, the terms "resource assignment" and "resource allocation" are used in this specification to denote both the same technical meaning of assigning or allocating resources. Both terms are therefore interchangeable without any change in content and technical meaning.

Long Term Evolution (LTE)

Third-generation mobile systems (3G) based on WCDMA radio-access technology are deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a mobile communication system called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE). The LTE system represents efficient packet-based radio access and radio access networks that provide full IP-based functionalities with low latency and low cost. According to LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted due to its inherent immunity to multipath interference (MPI) caused by a low symbol rate, the use of a cyclic prefix (CP), and its affinity to different transmission bandwidth arrangements. Single-Carrier Frequency Division Multiple Access (SC-FDMA) based radio access was adopted in the uplink, since provisioning of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in LTE (for example, Release 8).

LTE Architecture

The overall architecture of a communication system according to LTE(-A) shown in FIG. 1. A more detailed representation of the E-UTRAN architecture is given in FIG. 2.

The E-UTRAN comprises an eNodeB that provides the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are further connected by means of the S1 interface to the EPC (Evolved Packet Core). More specifically, eNodeBs are connected to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach time and at the time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE (such as Release 8) is subdivided in the time-frequency domain in so-called sub-frames. In 3GPP LTE each sub-frame is divided into two downlink slots as illustrated in FIG. 3, wherein the first downlink slot comprises the control channel region (PDCCH region) within the first OFDM symbols. Each sub-frame consists of a given number of OFDM symbols in the time domain (12 or 14 OFDM symbols in 3GPP LTE Release 8), wherein each of OFDM symbol spans over the entire bandwidth of the component carrier. Thus, each OFDM symbol consists of a number of modulation symbols transmitted on respective $N_{RB}^{DL} \times N_{sc}^{RB}$ subcarriers as also shown in FIG. 4.

Assuming a multi-carrier communication system, e.g., employing OFDM, as for example used in 3GPP Long Term Evolution (LTE), the smallest unit of resources that can be assigned by the scheduler is one "resource block". A physical resource block is defined as $N_{symb}^{DL}$ consecutive OFDM symbols in the time domain and $N_{sc}^{RB}$ consecutive subcarriers in the frequency domain as illustrated in FIG. 4. In 3GPP LTE (such as Release 8), a downlink physical resource block thus consists of $N_{symb}^{DL} \times N_{sc}^{RB}$ resource elements, corresponding to one slot in the time domain and 180 kHz in the frequency domain. Further details on the downlink resource grid can be obtained, for example, from 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference. Likewise, the sub-frame structure on a downlink component carrier and the downlink resource grid illustrated in FIGS. 3 and 4 are obtained from 3GPP TS 36.211.

For the LTE uplink resource allocation, the structure of the resource blocks is comparable to the above structure of the downlink resource grid. For the uplink resources, each OFDM symbol consists of a number of modulation symbols transmitted on respective $N_{RB}^{UL} \times N_{sc}^{RB}$ subcarriers as also shown in FIG. 5. The exemplary structure of an uplink resource grid illustrated in FIG. 5 corresponds to the structure of the exemplary downlink resource grid illustrated in FIG. 4. The exemplary uplink resource grid of FIG. 4 is obtained from 3GPP TS 36.211 V10.0.0, which is incorporated herein by reference and provides further details of the uplink resources in LTE (Release 10).

L1/L2 Control Signaling—Downlink Control Information in LTE(-A)

In order to inform a scheduled user or terminal about their allocation status, transport format and other data related information (e.g., HARQ information), L1/L2 (Layer1/Layer2) control signaling is transmitted on the downlink along with the data. L1/L2 control signaling is multiplexed with the downlink data in a sub-frame, assuming that the user allocation can change from sub-frame to sub-frame. It should be noted that user allocation might also be performed on a TTI (Transmission Time Interval) basis, where the TTI length is a multiple of the sub-frames. The TTI length may be fixed in a service area for all users, may be different for different users, or may even by dynamic for each user. Generally, the L1/2 control signaling needs only be transmitted once per TTI. The L1/L2 control signaling is transmitted on the Physical Downlink Control Channel (PD-CCH). It should be noted that in 3GPP LTE, assignments for uplink data transmissions, also referred to as uplink scheduling grants or uplink resource assignments, are also transmitted on the PDCCH.

Generally, the information sent on the L1/L2 control signaling (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e., resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CQI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

DCI occurs in several formats that differ in their overall size and the field information that is used. The different DCI formats that are currently defined for LTE(-A) Release 10 are described in detail in TS 36.212 v10.0.0 in section 5.3.3.1, available at http://www.3gpp.org and incorporated herein by reference.

The following two specific DCI formats defined in LTE show exemplarily some of the functionality of the various DCI formats:

DCI format 0 is used for the scheduling of the PUSCH (Physical Uplink Shared Channel) using single-antenna port transmissions in uplink transmission mode 1 or 2, DCI format 4 is used for the scheduling of the PUSCH (Physical Uplink Shared Channel) using closed-loop spatial multiplexing transmissions in uplink transmission mode 2.

Uplink transmission modes 1 and 2 are defined in TS 36.213 v10.0.1 in section 8.0, the single-antenna port is defined in section 8.0.1, and the closed-loop spatial multiplexing is defined in section 8.0.2, which are available at http://www.3gpp.org and incorporated herein by reference.

There are several different ways how to exactly transmit the information pieces mentioned above. Moreover, the L1/L2 control information may also contain additional information or may omit some of the information, such as:

the HARQ process number may not be needed in case of a synchronous HARQ protocol, as, for example, used in uplink, Spatial-multiplexing related control information, such as, for example, precoding, may be additionally included in the control signaling, or In case of multi-code word spatial multiplexing transmission, the MCS and/or HARQ information for multiple code words may be included.

For uplink resource assignments (e.g., concerning the Physical Uplink Shared Channel, PUSCH) signaled on PDCCH (Physical Downlink Control Channel) in LTE, the L1/L2 control information does not contain a HARQ process number, since a synchronous HARQ protocol is employed for LTE uplink transmissions. The HARQ process to be used for an uplink transmission is determined and given by the specified timing. Furthermore, it is to be noted that the redundancy version (RV) information and the MCS information are jointly encoded.

Downlink & Uplink Data Transmissions in LTE(-A)

This section provides further background on downlink and uplink data transmissions according to the technical specification of LTE(-A) that may be useful to comprehend the background, framework and full usability of the subsequently discussed embodiments of the invention. This section therefore provides only illustrative information concerning background information, a person skilled in the field of the invention will consider as common knowledge.

Regarding downlink data transmission in LTE, L1/L2 control signaling is transmitted on a separate physical channel (PDCCH), along with the downlink packet data transmission. This L1/L2 control signaling typically contains information on:

The physical resource(s) on which the data is transmitted (e.g., subcarriers or subcarrier blocks in case of OFDM, codes in case of CDMA). This information allows the UE (receiver) to identify the resources on which the data is transmitted.

When user equipment is configured to have a Carrier Indication Field (CIF) in the L1/L2 control signaling this information identifies the component carrier for which the specific control signaling information is intended. This enables assignments to be sent on one component carrier which are intended for another component carrier ("cross-carrier scheduling"). This other, cross-scheduled component carrier could be for example a PDCCH-less component carrier, i.e., the cross-scheduled component carrier does not carry any L1/L2 control signaling.

The Transport Format, which is used for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (receiver) to identify the information bit size, the modulation scheme and the code rate in order to start the demodulation, the de-rate-matching and the decoding process. The modulation scheme may be signaled explicitly.

Hybrid ARQ (HARQ) information:
  HARQ process number: Allows the user equipment to identify the hybrid ARQ process on which the data is mapped.
  Sequence number or new data indicator (NDI): Allows the user equipment to identify if the transmission is a new packet or a retransmitted packet. If soft combining is implemented in the HARQ protocol, the sequence number or new data indicator together with the HARQ process number enables soft-combining of the transmissions for a PDU prior to decoding.
  Redundancy and/or constellation version: Tells the user equipment, which hybrid ARQ redundancy version is used (required for de-rate-matching) and/or which modulation constellation version is used (required for demodulation).
  UE Identity (UE ID): Tells for which user equipment the L1/L2 control signaling is intended for. In typical implementations this information is used to mask the CRC of the L1/L2 control signaling in order to prevent other user equipments to read this information.

To enable an uplink packet data transmission in LTE, L1/L2 control signaling is transmitted on the downlink (PDCCH) to tell the user equipment about the transmission details. This L1/L2 control signaling typically contains information on:
  The physical resource(s) on which the user equipment should transmit the data (e.g., subcarriers or subcarrier blocks in case of OFDM, codes in case of CDMA).
  When user equipment is configured to have a Carrier Indication Field (CIF) in the L1/L2 control signaling this information identifies the component carrier for which the specific control signaling information is intended. This enables assignments to be sent on one component carrier which are intended for another component carrier. This other, cross-scheduled component carrier may be for example a PDCCH-less component carrier, i.e., the cross-scheduled component carrier does not carry any L1/L2 control signaling.
  L1/L2 control signaling for uplink grants is sent on the DL component carrier that is linked with the uplink component carrier or on one of the several DL component carriers, if several DL component carriers link to the same UL component carrier.
  The Transport Format, the user equipment should use for the transmission. This can be the transport block size of the data (payload size, information bits size), the MCS (Modulation and Coding Scheme) level, the Spectral Efficiency, the code rate, etc. This information (usually together with the resource allocation (e.g., the number of resource blocks assigned to the user equipment)) allows the user equipment (transmitter) to pick the information bit size, the modulation scheme and the code rate in order to start the modulation, the rate-matching and the encoding process. In some cases the modulation scheme maybe signaled explicitly.
  Hybrid ARQ information:
    HARQ Process number: Tells the user equipment from which hybrid ARQ process it should pick the data.
    Sequence number or new data indicator: Tells the user equipment to transmit a new packet or to retransmit a packet. If soft combining is implemented in the HARQ protocol, the sequence number or new data indicator together with the HARQ process number enables soft-combining of the transmissions for a protocol data unit (PDU) prior to decoding.
    Redundancy and/or constellation version: Tells the user equipment, which hybrid ARQ redundancy version to use (required for rate-matching) and/or which modulation constellation version to use (required for modulation).
  UE Identity (UE ID): Tells which user equipment should transmit data. In typical implementations this information is used to mask the CRC of the L1/L2 control signaling in order to prevent other user equipments to read this information.

There are several different available ways of how to exactly transmit the information pieces mentioned above in uplink and downlink data transmission in LTE. Moreover, in uplink and downlink, the L1/L2 control information may also contain additional information or may omit some of the information. For example:
  HARQ process number may not be needed, i.e., is not signaled, in case of a synchronous HARQ protocol.
  A redundancy and/or constellation version may not be needed, and thus not signaled, if Chase Combining is used (always the same redundancy and/or constellation version) or if the sequence of redundancy and/or constellation versions is pre-defined.
  Power control information may be additionally included in the control signaling.
  MIMO related control information, such as, e.g., pre-coding, may be additionally included in the control signaling.
  In case of multi-code word MIMO transmission transport format and/or HARQ information for multiple code words may be included.

For uplink resource assignments (on the Physical Uplink Shared Channel (PUSCH)) signaled on PDCCH in LTE, the L1/L2 control information does not contain a HARQ process number, since a synchronous HARQ protocol is employed for LTE uplink. The HARQ process to be used for an uplink transmission is given by the timing. Furthermore it should be noted that the redundancy version (RV) information is jointly encoded with the transport format information, i.e., the RV info is embedded in the transport format (TF) field. The Transport Format (TF) respectively modulation and coding scheme (MCS) field has for example a size of 5 bits, which corresponds to 32 entries. 3 TF/MCS table entries are reserved for indicating redundancy versions (RVs) 1, 2 or 3. The remaining MCS table entries are used to signal the MCS level (TBS) implicitly indicating RV0. The size of the CRC field of the PDCCH is 16 bits.

For downlink assignments (PDSCH) signaled on PDCCH in LTE the Redundancy Version (RV) is signaled separately in a two-bit field. Furthermore the modulation order information is jointly encoded with the transport format information. Similar to the uplink case there is 5 bit MCS field signaled on PDCCH. 3 of the entries are reserved to signal an explicit modulation order, providing no Transport format (Transport block) info. For the remaining 29 entries modulation order and Transport block size info are signaled.

Resource Allocation Fields for Uplink Resource Assignments

According to 3GPP TS 36.212 v10.0.0, the DCI formats 0 can, for example, be used for uplink resources assignments. The DCI formats 0 contains—amongst others—a so-called "resource block assignment and hopping resource allocation" field, which has a size of $\lceil \log_2(N_{RB}^{UL}(N_{RB}^{UL}+1)/2) \rceil$ bits, where $N_{RB}^{UL}$ denotes the number of resource blocks in the uplink.

LTE-(A) presently foresees three possible uplink resource allocation schemes, which are single-cluster allocation with non-hopping PUSCH (Physical Uplink Shared channel), single-cluster allocation with hopping PUSCH and multi-cluster allocation. Multi-cluster allocation is introduced in Release 10 and is only supported as with non-hopping PUSCH.

In case of a single-cluster allocation with non-hopping PUSCH, the entire "resource block assignment and hopping resource allocation" field of the DCI is used to signal the resource allocation in the uplink sub-frame.

In case of a single-cluster allocation with hopping PUSCH, the $N_{UL\_hop}$ MSB (most significant bits) of the field are used to specify the detailed hopping configuration, while the remainder of the field provides the resource allocation in the first slot in the uplink sub-frame. $N_{UL\_hop}$ can thereby be determined from the system bandwidth according to table 1. Table 1 is obtained from table 8.4-1 of 3GPP TS 36.213 v10.0.1, which is incorporated herein by reference. The system bandwidth $N_{RB}^{UL}$ denotes the number of uplink physical resource blocks.

TABLE 1

| System Bandwidth $N_{RB}^{UL}$ | Number of Hopping bits for second slot RA $N_{UL\_hop}$ |
| --- | --- |
| 6-49 | 1 |
| 50-110 | 2 |

In case of a multi-cluster allocation with non-hopping PUSCH, the uplink resource allocation is signaled using the concatenation of the frequency hopping flag field and the resource block assignment and hopping resource allocation field of the DCI.

The case of multi-cluster allocation with hopping PUSCH is not defined in LTE. For this reason, the frequency hopping flag field (as required for single-cluster allocation) can be used for signaling uplink resource allocation in case of multi-cluster allocation.

For multi-cluster allocations, $$\left\lceil \log_2\left(\binom{\lceil N_{RB}^{UL}/P+1 \rceil}{4}\right)\right\rceil$$

bits are required to denote or specify all allowed and supported combinations. According to 3GPP LTE(-A) multi-cluster allocation, the smallest unit of uplink resources that can be assigned is one "resource block group" (RBG) as outlined below in more details.

The size of the RBG can be determined from the system bandwidth according to table 2. Table 2 is obtained from table 7.1.6.1-1 of 3GPP TS 36.213 v10.0.1 by replacing $N_{RB}^{DL}$ with $N_{RB}^{UL}$ accordingly. The system bandwidth $N_{RB}^{UL}$ denotes the number of uplink physical resource blocks.

TABLE 2

| System Bandwidth $N_{RB}^{UL}$ | RBG Size (P) |
| --- | --- |
| ≤10 | 1 |
| 11-26 | 2 |
| 27-63 | 3 |
| 64-110 | 4 |

Multi-Cluster Allocation Interpretation

As mentioned above, hopping is not supported for LTE multi-cluster RBA. The hopping flag of the DCI is therefore prepended to the RBA field, which increases the size by 1 bit. While for single-cluster the allocation is based on a resource-block granularity, for multi-cluster allocations the granularity is based on a resource block group (RBG). An RBG is the union of P adjacent RBs, where P can be established using Table 2 for any uplink system bandwidth supported by LTE. The only exception is the case where $N_{RB}^{UL}$ is not an integer multiple of P, and where therefore the last RBG contains the remaining RBs. Each RB is part of only one RBG. The number of uplink RBGs $N_{RBG}^{UL}$ can then be computed as $$N_{RBG}^{UL} = \left\lceil \frac{N_{RB}^{UL}}{P} \right\rceil.$$

As multi-cluster allocation is known and defined in 3GPP LTE Release 10, further details of the RBGs and the allowed combination of RBs (which form the RBGs) that are supported by the system are not required and therefore omitted. The multi-cluster allocation according to 3GPP LTE Release 10 and specifically the DCI format 0 for signaling the multi-cluster resource allocation as defined in 3GPP TS 36.212 V10.0.0 is incorporated herein by reference.

According to 3GPP LTE Release 10, multi-cluster allocations are restricted to support only two clusters, where the first cluster is identified by the starting RBG $s_0$ and ending RBG $s_1-1$, and where the second cluster is identified by the starting RBG $s_2$ and ending RBG $s_3-1$. These four parameters are then linked into a single value r which represents the multi-cluster allocation by the following formula:

$$r = \binom{n-s_0}{M} + \binom{N-s_1}{M-1} + \binom{N-s_2}{M-2} + \binom{N-s_3}{M-3},$$

where M=4 (corresponding the four starting and ending RBGs that define a multi-cluster consisting of two clusters), $N=N_{RBG}^{UL}+1$ and $1 \leq s_0 < s_1 < s_2 < s_3 \leq N$, and where $$\binom{x}{y} = \begin{cases} \binom{x}{y} = \frac{x!}{y! \cdot (x-y)!} & x \geq y \\ 0 & x < y \end{cases}.$$

Furthermore, 3GPP LTE Release 10 requires that the two clusters are non-adjacent, i.e., there is a spacing of at least one RBG between the end of the first cluster and the start of the second cluster. This conditions leads to the above formula and the inequality relations between values $s_0$, $s_1$, $s_2$, $s_3$.

The present invention has recognized that for most cases (i.e., for most values of the uplink system bandwidth define by the specification 3GPP TS 36.213), the number of available bits in the DCI and required bits to denote all allowed RBG allocation combinations supported by the system are matching. However, for some cases an insufficient number of bits is available in the DCI as outlined above.

BRIEF SUMMARY

The invention is intended to overcome one or more of the discussed and outlined problems of known resource allocation concepts of mobile communication systems or to improve the signaling of the known resource allocation concepts.

It is an object of the invention to provide an improved method for signaling resource allocation information to a terminal of a mobile communication system used for assigning resources to the terminal, as well as a corresponding terminal and a corresponding base station.

This object is solved by the subject matter of the independent claims.

Preferred embodiments of the invention are defined by the dependent claims.

The present invention has recognized that situations can occur, in which the number of bits available for signaling the resource assignment information is insufficient to represent the allowed resource assignments that are supported by the communication system. In case of LTE, the "allowed resource assignments" can be the different RBG (i.e., the allowed combinations of RBs) resource allocations that are supported by the system for multi-cluster allocation.

A first embodiment of the invention concerns a method performed by a terminal of a mobile communication system to receive and determine resource allocation information that indicates to the terminal assigned resources for the terminal. The terminal receives, according to this embodiment, downlink control information (DCI), which comprises a field for indicating a resource allocation for the terminal. This resource assignment field within the DCI has a predetermined number of bits. The terminal determines its assigned resource allocation information from the content of that field in the received DCI, even though—at least for one or more specific resource allocation cases—the predetermined bit size of the resource allocation field in the received DCI is insufficient to represent all allowed resource allocations that are supported by the communication system. According to this embodiment, it is therefore suggested that the received bits that are signaled to the terminal in the mentioned field of the DCI represent predetermined (subset of) bits of the resource allocation information. All remaining one or more bits of the resource allocation information that are not included in the field of the received DCI are set to predetermined value, e.g., to either 1 or 0.

The DCI used to signal the resource allocation information can have a predetermined format, in which case the number of bits of the field that is used for signaling the resource allocation information in the DCI can be predefined for any allowed bandwidths supported by the system. This implies that the terminal is able to determine the expected bit size of the signaled resource allocation information (i.e., the size of the field within the received DCI containing the resource allocation information).

Another embodiment of the invention concerns a method of transmitting resource allocation information for assigning resources to a terminal of a mobile communication system. For this, a base station determines the resource allocation information to be transmitted to the terminal. The base station can further determine the number of bits that are available for signaling the resource allocation information within the downlink control information (DCI). The number of available bits can thereby be the size of one or more field(s) for transmitting resource allocation information within the DCI. The number of bits that are available for signaling the resource allocation information (i.e., the bit size of the mentioned field within the DCI) is predetermined for a given bandwidth (and can therefore be determined by the base station, and by the terminal as soon as it is aware of the relevant bandwidth).

If the number of available bits for signaling the resource allocation information is insufficient to represent the plurality of allowed resource allocations, the base station transmits a predetermined subset of bits of the resource allocation information within the field of the DCI to said terminal. All remaining one or more bits of the resource allocation information that are not, or cannot be, transmitted to the terminal have a predetermined value or are set to a predetermined value.

According to a specific embodiment of the invention the mobile communication system is a 3GPP LTE system or 3GPP LTE-A system. In this case, the terminal is a user equipment (UE) or a relay node. Likewise, the base station is an evolved Node B (eNodeB) or a relay node. The DCI format in this case can be the DCI format 0 as defined in 3GPP LTE or 3GPP LTE-A. Alternatively, DCI format 4 as defined in 3GPP LTE or 3GPP LTE-A may be used for some embodiments of the invention.

The aforementioned remaining one or more bits of the resource allocation information that are not signaled in said field of said DCI can be the most significant bit(s), MSBs, or the least significant bit(s), LSBs, of said resource allocation information.

Further, the position and/or the value of these remaining one or more bits within the resource allocation information can either be predefined (e.g., in the system according to a technical requirements specification), or predetermined by the base station and then signaled to the terminal.

Further embodiments of the inventions concern 3GPP LTE, where the resource allocation information represents the allocation of resource blocks, RBs, according to a single-cluster resource allocation in DCI format 0 or DCI format 4 defined in 3GPP LTE or 3GPP LTE-A.

Alternatively or additionally, the resource allocation information can represent the allocation of resource block groups, RBGs, according to a multi-cluster resource allocation in DCI format 0 or DCI format 4 defined in 3GPP LTE or 3GPP LTE-A, where an RBG comprises a predefined plurality of adjacent RBs.

It is further foreseen according to an embodiment of the invention that the value and the positions of said remaining one or more bits of the resource allocation information (that are not signaled in the field of the DCI) are predetermined in order to limit the number or combinations of RBs that are assignable to said terminal.

Alternatively, the value and the positions of the remaining one or more bits can be predetermined to limit the number or combinations of RBGs that are assignable to the terminal.

According to this embodiment of the invention, the predetermined value and the predetermined positions of the remaining one or more bits can be chosen so as to exclude an allocation of one or more edge physical resource blocks, PRBs, for example useable by the communication system for physical uplink control channel, PUCCH, transmissions. It may further be advantageous to exclude an allocation of one or more edge physical resource blocks since this reduces the amount of generated out-of-band interference, i.e., power that is leaked outside of the allowed bandwidth.

Further embodiments of the invention propose a re-interpretation or re-mapping scheme for the signaled resource allocation information that is applied by the base station and/or the terminal to change the RBs, RBGs or the combinations thereof that are assignable to said terminal.

This re-interpretation scheme can include a mirroring from low RB or RBG indices to high RB or RBG indices, respectively, and vice versa. Alternatively or additionally, the re-interpretation scheme can include a shift of the signaled resource allocation information by a predetermined offset, wherein the offset is defined as a number of RBs or RBGs.

The re-interpretation scheme can be configured by a base station or can be signaled by said base station to said terminal.

According to a further embodiment of the invention is a method of transmitting resource allocation information for assigning uplink resources to a terminal of a 3GPP LTE or 3GPP LTE-A communication system provided. The method is performed by a base station or relay node. The base station is configured to transmit resource allocation information within a field of downlink control information, DCI, to the terminal. The resource allocation information can thereby represent different resource block groups, RBGs, according to a multi-cluster resource allocation in said 3GPP LTE or 3GPP LTE-A communication system. The available bit size of the field of the DCI used for transmitting the resource allocation information is thereby sufficient to represent a plurality of possible uplink resource allocations, because the RBG size is determined according to a novel manner.

The RBG size according to this embodiment of the invention can be determined for a given number of uplink resource blocks according to:

| $N_{RB}^{UL}$ | $P_{RBG}^{UL}$ |
|---|---|
| ≤6, 8 | 1 |
| 7, 9-26 | 2 |
| 27-54 | 3 |
| 55-84, 91-100 | 4 |
| 85-90, 101-110 | 5 |

Alternatively, the RBG size according to this embodiment of the invention can be determined for a given number of uplink resource blocks according to:

| $N_{RB}^{UL}$ | $P_{RBG}^{UL}$ |
|---|---|
| ≤6 | 1 |
| 7-26 | 2 |
| 27-54 | 3 |
| 55-84 | 4 |
| 85-110 | 5 |

In both cases, the value $N_{RB}^{UL}$ denotes the number of uplink resource blocks and the value $P_{RBG}^{UL}$ denotes the corresponding RBG size in number of RBs.

According to still a further embodiment of the invention is method of receiving resource allocation information for assigning uplink resources to a terminal of a 3GPP LTE or 3GPP LTE-A communication system provided. The method is performed by the terminal or relay node. The terminal is configured to receive downlink control information, DCI that comprises a field for signaling the resource allocation information of said terminal. This field has a predetermined number of bits and the resource allocation information represents resource block groups, RBGs, according to a multi-cluster resource allocation in said 3GPP LTE or 3GPP LTE-A communication system. The bit size of the field of the DCI used for signaling the resource allocation information is thereby sufficient to represent a plurality of possible uplink resource allocations, because the RBG size is determined according to a novel manner. The manner of determining the RBG size for a given number of uplink resource blocks is based on either of the two tables shown above.

According to yet another embodiment of the invention is terminal provided for receiving resource allocation information for assigning resources to said terminal within a mobile communication system. The terminal comprises means for receiving downlink control information, DCI that comprises a field for indicating the resource allocation information of the terminal. The field has a predetermined number of bits. The terminal further comprises means for determining the resource allocation information from the bits of the field in the received DCI. The predetermined number of bits of the field in the received DCI is thereby insufficient to represent the plurality of allowed resource allocations that are supported by the communication system, e.g., insufficient to represent the plurality of allowed multi-cluster resource allocations. Therefore, it is suggested that the bits of the field in the received DCI represent predetermined bits of the resource allocation information, while all remaining one or more bits of the resource allocation information that are not included in the field of the received DCI are set to predetermined value.

According to a further embodiment of the invention is a base station provided for transmitting resource allocation information for assigning resources to a terminal of a mobile communication system. The base station comprises means for determining resource allocation information that is to be transmitted to the terminal. The base station further comprises means for determining the number of available bits for signalling the resource allocation information within downlink control information, DCI. The number of available bits is thereby the size of the field for transmitting resource allocation information within said DCI. Moreover, the DCI has a predetermined format and for a given bandwidth the number of bits available for signalling the resource allocation information within the DCI is specified. The base station further comprises means for transmitting a predetermined subset of the bits of the resource allocation information within the field of the DCI to the terminal, if the number of available bits for signalling the resource allocation information is insufficient to represent the plurality of allowed resource allocations, while all remaining one or more bits of the resource allocation information that are not transmitted have a predetermined value.

BRIEF DESCRIPTION OF THE SEVERAL VIEWS OF THE FIGURES

In the following the embodiments and aspects of the invention are described in more detail under reference to the attached figures. Similar or corresponding details in the figures are marked with the same reference numerals.

DETAILED DESCRIPTION

This section will describe various embodiments of the invention. For exemplary purposes only, most of the embodiments are outlined in relation to an orthogonal single-carrier uplink radio access scheme according to 3GPP LTE (such as Release 8 or 9) and LTE-A (such as Release 10) mobile communication systems discussed in the Technical Background section above. It is to be noted that the invention may be advantageously used in connection with a mobile communication system such as 3GPP LTE and LTE-A communication systems previously described, but the invention is not limited to this particular exemplary communication system.

The details given herein of 3GPP LTE and LTE-A are intended to provide a better understanding of the invention and should not be understood as limiting the invention to the described specific implementation details of the described mobile communication system.

As discussed above, the invention has recognized that situations can occur, in which the number of bits available for signaling the resource assignment information is insufficient to represent the allowed resource assignments that are supported by the communication system. In case of LTE multi-cluster allocation, the allowed resource assignments are the different RBG (i.e., the allowed combinations of RBs) allocation combinations that are supported by the system.

For the specific case of LTE multi-cluster allocations according to DCI format 0, the number of bits for the resource allocation field that are required to address all allowed RBG combinations is (as explained above)

$$\left\lceil \log_2\left(\binom{\lceil N_{RB}^{UL}/P + 1\rceil}{4}\right)\right\rceil.$$

The bits available in the DCI to signal the uplink resource allocation to the terminal can be computed from $\lceil \log_2(N_{RB}^{UL}(N_{RB}^{UL}+1)/2)\rceil+1$, where the "+1" is the result of using the "frequency hopping field flag" as discussed in the background section and as specified in 3GPP LTE-A Release 10.

For most numeric cases covered by the 3GPP LTE specification for multi-cluster allocation, the number of available bits and required bits shows no problem. However, in some cases not sufficient bits are available, as shown in FIG. 6.

Figure 1:
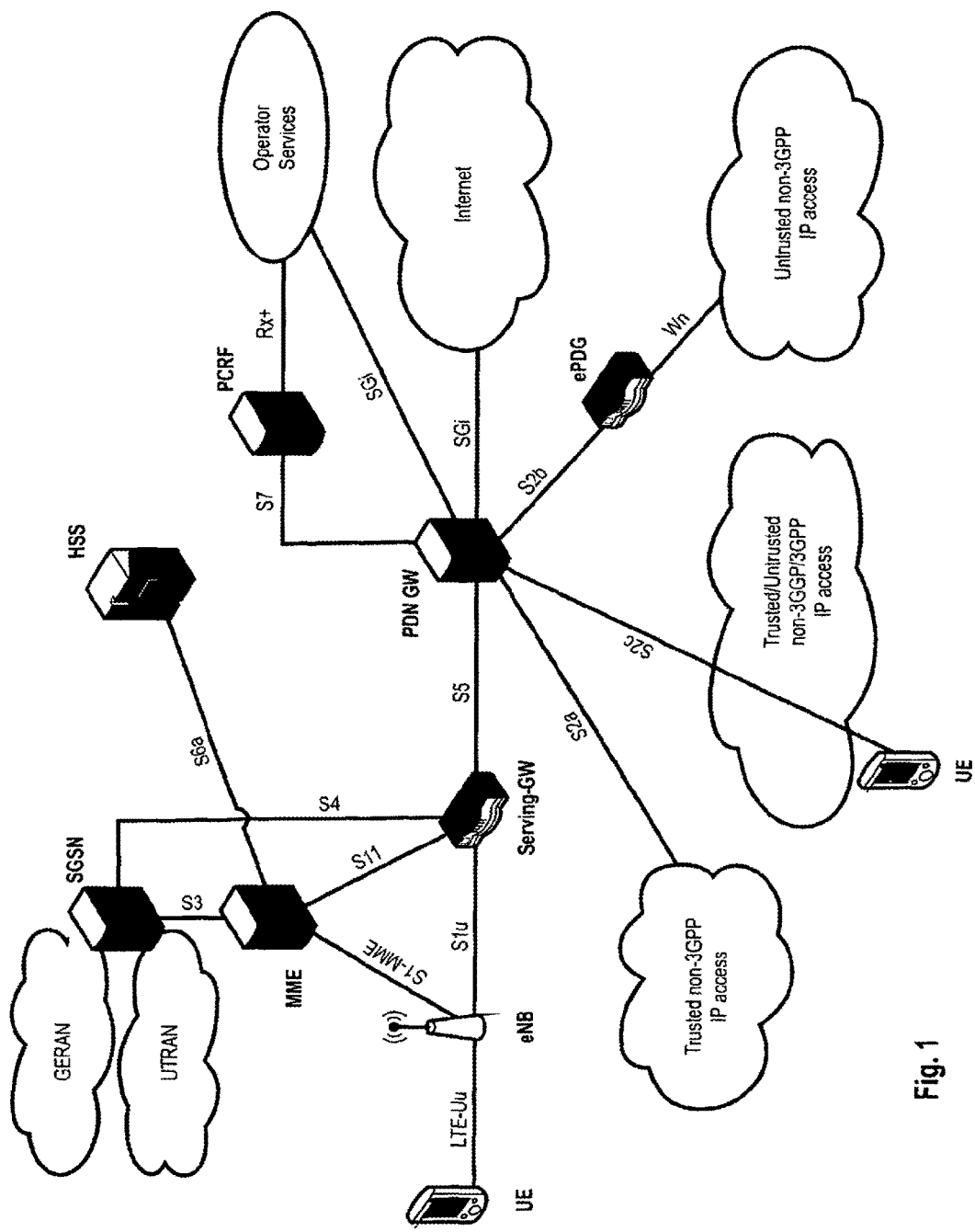
FIG. 1 shows an exemplary architecture of a 3GPP LTE system.
Figure 2:
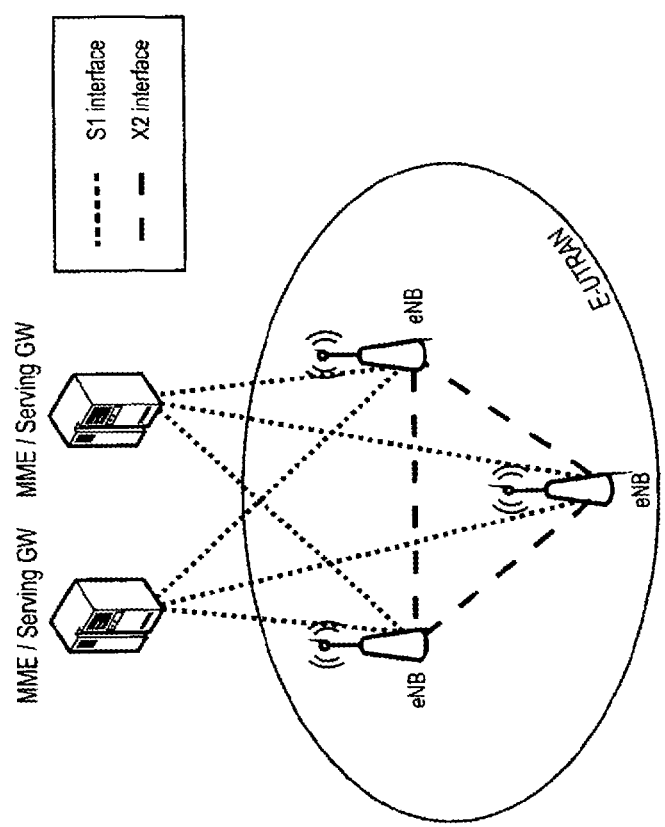
FIG. 2 shows an exemplary overview of the overall E-UTRAN architecture of 3GPP LTE.
Figure 3:
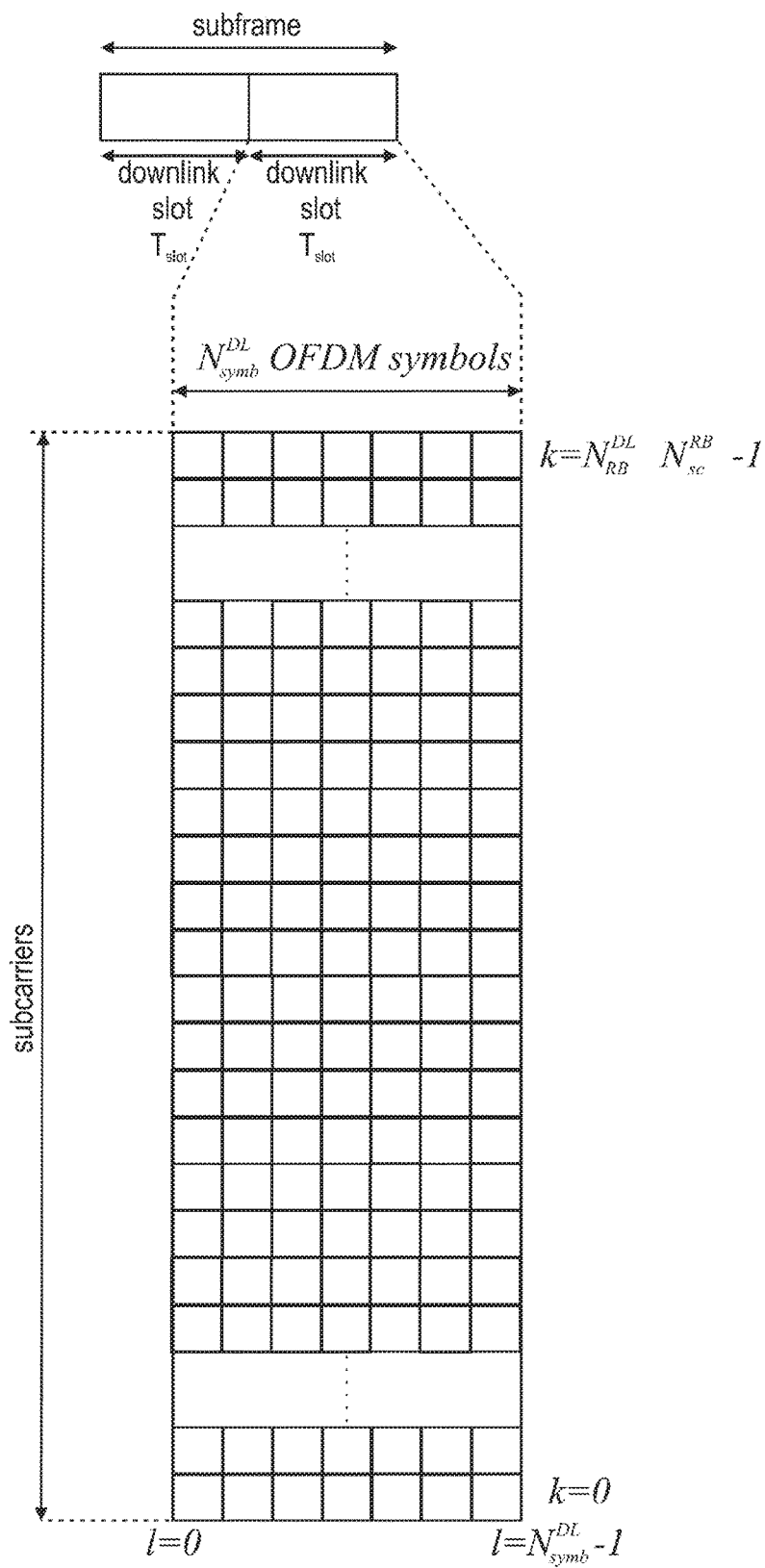
FIG. 3 shows an exemplary sub-frame structure on a downlink component carrier as defined for 3GPP LTE (Release 10)
Figure 4:
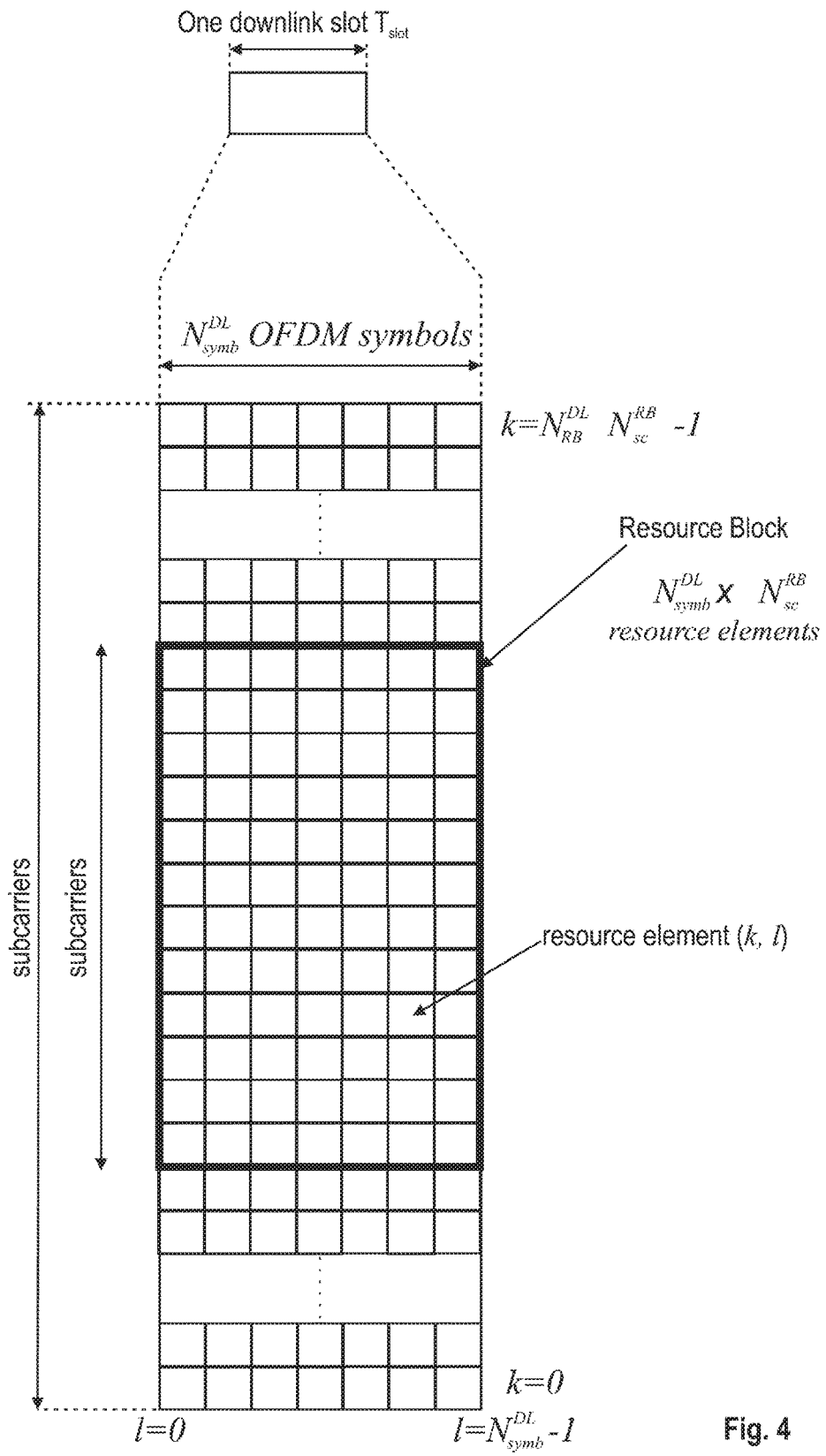
FIG. 4 shows an exemplary downlink resource grid of a downlink slot as defined for 3GPP LTE (Release 8/9)
Figure 5:
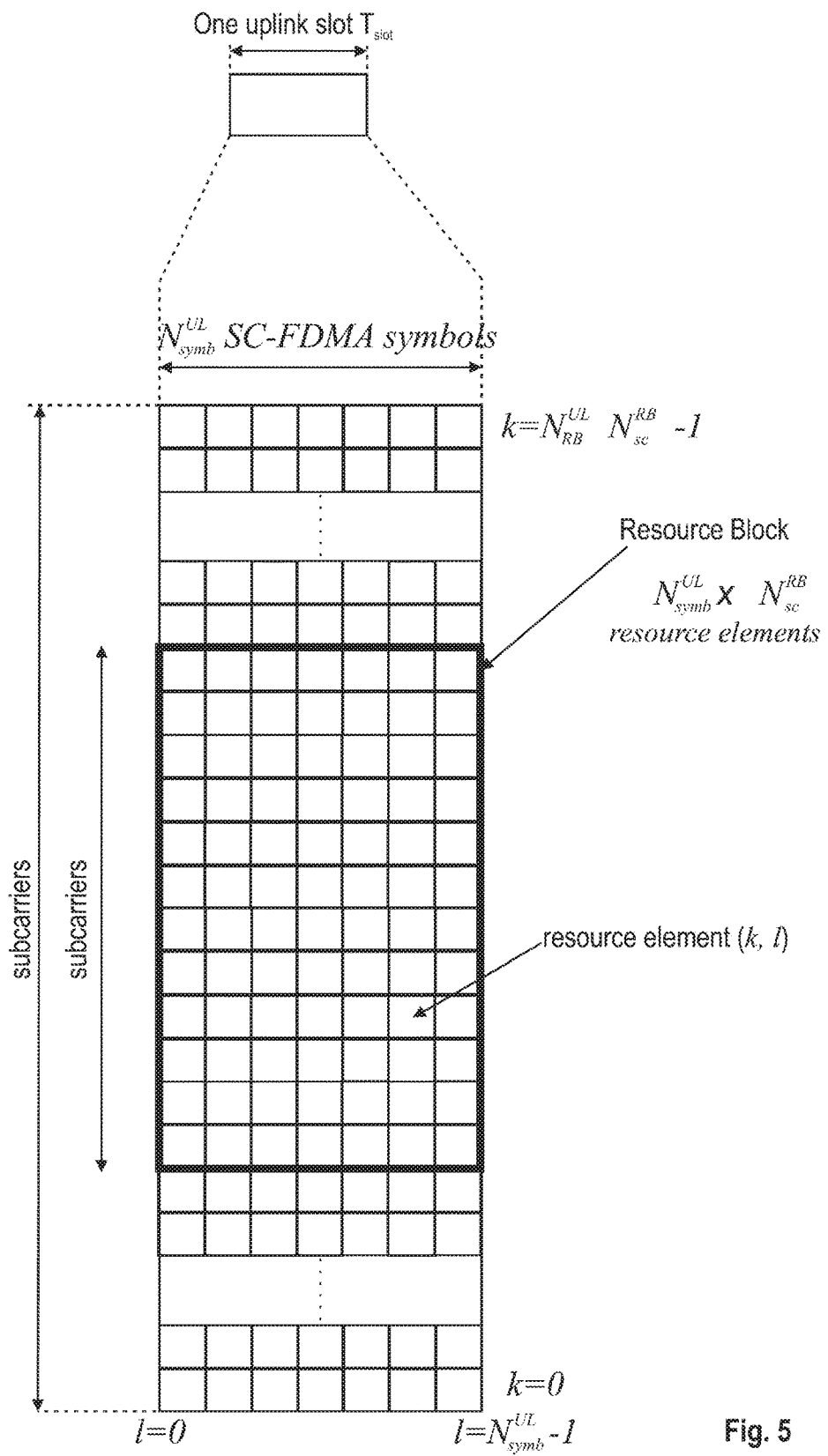
FIG. 5 shows an exemplary uplink resource grid of an uplink slot as defined for 3GPP LTE (Release 10)
Figure 6:
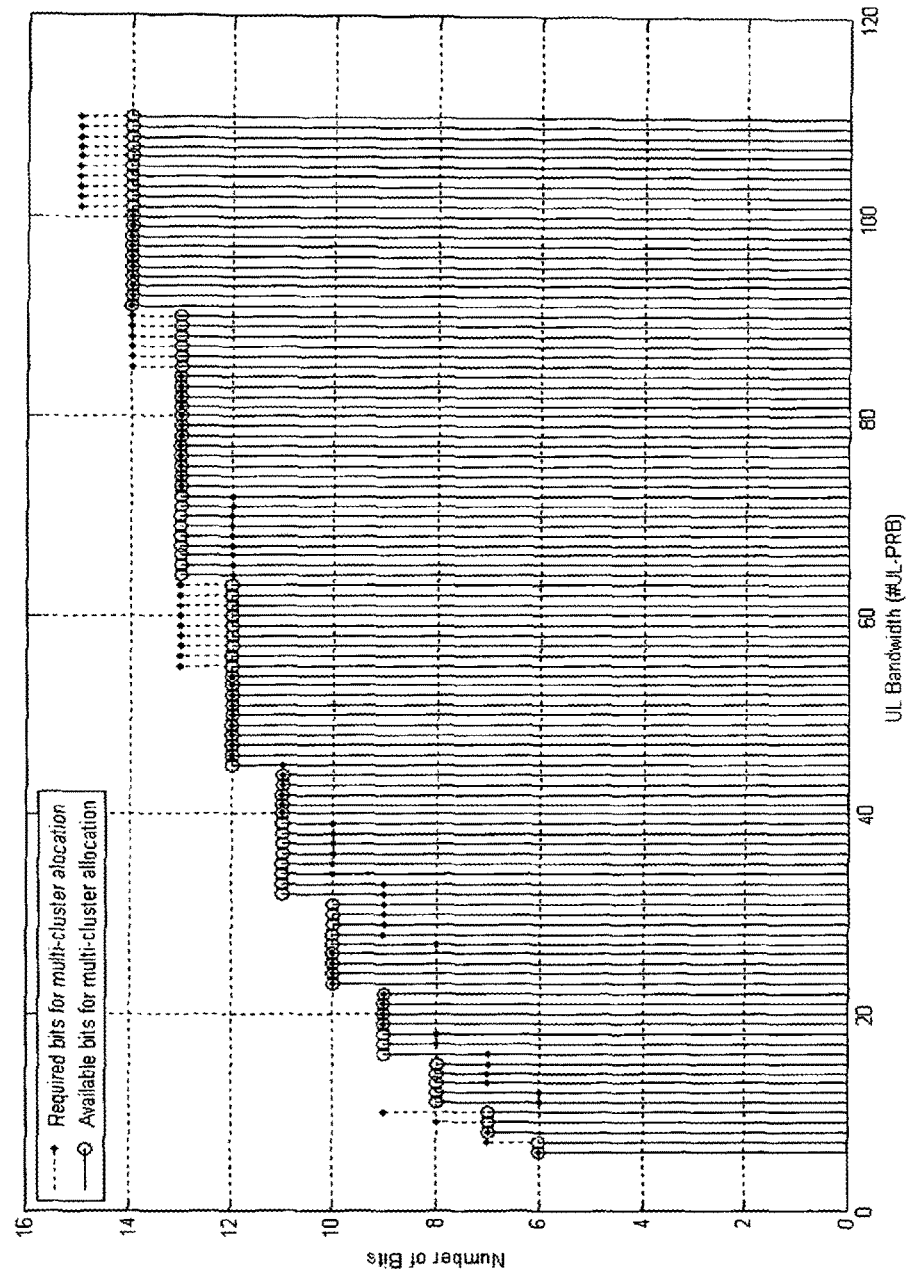
FIG. 6 shows the number bits available within DCI format 0 for specifying the allocated RBG and the number of required bits to specify all allowed RBGs as supported and defined by 3GPP LTE (Release 10) in regard to one aspect of the present invention.

Specifically, FIG. 6 shows the number bits available within DCI format 0 for specifying the allocated RBG and the number of required bits to specify all allowed RBG combinations as supported and defined by 3GPP LTE, Release 10, for multi-cluster allocation.

As can be obtained from FIG. 6 or the above given formulas, the number of bits available in the DCI format 0 is insufficient for the following number of $N_{RB}^{UL}$: 7, 9, 10, 55-63, 85-90, 101-110 (where only the range from 6-110 has been regarded exemplarily and for simplicity). As noted above, N denotes the system bandwidth in terms of the number of physical uplink resource blocks.

For the 3GPP LTE-(A) specification, the currently supported system bandwidth for uplink transmissions ranges from 6 to 110, while at least the values 5, 15, 25, 50, 75 and 100 are currently commonly used values. Thus, for commonly used system bandwidths the number of available bits in the DCI is sufficient to represent all allowed resource allocations.

These "allowed" resource allocations are the allocations that are supported by the technical specifications of LTE(-A). For single-cluster allocation, the allowed resource allocations are the different sets of uplink resource blocks that are assignable to the UEs and supported by the LTE(-A) system. More specifically, for single-cluster allocation, the assigned uplink resources are each adjacent uplink resource blocks (RBs). The assigned uplink resources are specified in the DCI by the first RB and the length of the uplink resource, i.e., the number RBs. The first RB and length information are combined into a resource indication value RIV, as provided by TS 36.213 v10.0.1 section 8.1.1, that is to be signaled in the DCI. Additionally, the DCI includes a flag for indicating whether frequency hopping is used for the allocation.

For multi-cluster allocation, the allowed resource allocations are the different combinations of uplink resource block groups (RBGs) that are assignable to the UEs and supported by the LTE(-A) system. More specifically, LTE multi-cluster allocation supports multi-cluster allocation with two clusters, where each cluster is a chunk of adjacent RBGs (and therefore RBs) and where the two clusters are separated by at least one RBG (as noted above and specified in LTE-A release 10). Thus, the plurality of different allowed resource allocations for multi-cluster allocation can be seen as all different combinations of RBGs within two clusters that are supported by the LTE-A specification. As noted before, the assigned multi-cluster allocation according to LTE Release 10 is signaled as one value r that is determined based on the beginning and ending RB of the two clusters according a rule defined in the LTE-A specification (e.g., TS 36.213 v10.0.1 section 8.1.2). As also noted above, the LTE-A specification further defines that the hopping flag of the DCI used for single-cluster allocation is to be also used when signaling the multi-cluster allocation information r.

For future releases, the allowed number of clusters may be greater than two and multi-cluster allocation may be introduced for downlink resource allocation too. However, the allowed resource allocations, i.e., the different RBs or RBGs, and a manner to signal them to the UEs in DCI will also be provided by future releases. The number of bits that are required to represent all allowed resource allocations is given by and can unambiguously determined from the technical specification itself.

According to the example of FIG. 6, one or two additional resource information bits would be required (i.e., for bandwidths 7, 9, 10, 55-63, 85-90, 101-110) to be able to address all allowed RBGs that are supported by LTE, i.e., to represent all allowed values of the multi-cluster allocation information r.

Since the number of bits is predefined by the LTE technical specification (as outlined above), the UE can determine the size of the signaled resource allocation information by itself, or the UE can be pre-configured to a given resource allocation information size. In other words, the LTE technical specification requires that for a given bandwidth (e.g., $N_{RB}^{UL}=7$ in the example of FIG. 6) the resource allocation information (e.g., the value r) has a certain bit-size (e.g., 7 in the example of FIG. 6 for $N_{RB}^{UL}=7$). Likewise, the LTE specification defines the DCI format including the size of field for signaling the resource allocation information to the UE. If this size is insufficient to represent all allowed values r, the UE expects to receive resource allocation information with a certain bit size, but the actually received information in the DCI has a smaller bit-size. The UE behavior for handling such a situation is not specified and therefore is undefined. The UE preferably ignores the whole received information in this undefined situation to avoid behavior that negatively affects the terminal or system performance.

To resolve the problem of insufficient bits in the DCI to represent all allowed assignable resource allocations (e.g., for bandwidths 7, 9, 10, 55-63, 85-90, 101-110 in FIG. 6), the straightforward solution is to add the additionally required one or more bits to the respective field in the DCI so that all assignable resource allocations can be expressed and signaled to the UE.

However, this feasible solution has the drawback that it would not be backward compatible to earlier LTE releases (e.g., releases 8 and 9), specifically to UEs that are manufactured to conform to those releases only. Moreover, it has the disadvantage that the resource allocation information signaled to the UE as part of the DCI has different sizes (i.e., different numbers of bits) for single-allocation and for multiple cluster allocation, which adds substantial complexity because an additional DCI size that needs to be detected increases the blind decoding efforts required to detect the DCI at the UE.

The invention proposes a different solution to this problem caused by insufficient available bits in the DCI, including but not limited to LTE multi-cluster allocations according to DCI format 0. The proposed solution does not increase the number of bits used in the transmitted DCI for signaling the allocated resources, for example assigned RBGs for LTE multi-cluster allocations according to DCI format 0, and therefore keeps the DCI detection complexity at the UE at the same level.

According to one embodiment of the invention, only as many bits of the resource allocation information as can be sent in the DCI are signaled to the UE if the number of available bits in the DCI is insufficient. All remaining bits of the resource allocation information (i.e., those bits for which additional bits would be required as discussed above) are assumed to be, or set to, a predefined value. In other words, these remaining bits of the resource allocation information (for example representing the value r discussed above for multi-cluster allocation) that cannot be signaled in the DCI due to insufficient bits are set to either 0 or 1. The "resource allocation information" in this context is the information required to represent all allocations (e.g., all RBGs for multi-cluster allocation) that are supported by the LTE specification.

Consequently, it is suggested to provide a new interpretation of the signaled bits at the transmitter (eNodeB) and receiver (UE) sides so that the known and unchanged DCI format can nonetheless be used to signal a meaningful resource allocation information.

In the following, this approach for 3GPP LTE multi-cluster allocation using DCI format 0 is developed. For this, the following mathematical properties are used:

$$\binom{x}{y} = \binom{x-1}{y} + \binom{x-1}{y-1} \quad \text{(Equation 1)}$$

It can be noted that each of these terms is 0 or a positive integer number for any non-negative integers x and y. As the invention is concerned with uplink or downlink resource allocations, these conditions are always fulfilled.

$$\binom{x}{y} \geq \binom{x}{y-1} \bigg/ y \leq \left\lceil \frac{x}{2} \right\rceil \binom{x}{y} \geq \binom{x-1}{y}$$

To analyze the value r, it is helpful to analyze the relationship between the two first terms $$\binom{N-s_0}{M} \text{ and } \binom{N-s_1}{M-1}.$$

Assuming that $N-s_0 \geq M$ and $N-s_1 \geq M-1$, it is possible to write these terms as $$\binom{N-s_0}{M} \text{ and } \binom{N-s_1}{M-1},$$

respectively.

The first term can be converted according to Equation 1 to:

$$\binom{N-s_0}{M} = \binom{N-(s_0+1)}{M} + \binom{N-(s_0+1)}{M-1}.$$

Therefore, the following applies:

$$\binom{N-s_0}{M} \geq \binom{N-(s_0+1)}{M-1}.$$

Equality holds only if $N-(s_0+1)=0$, i.e., $s_0=N-1$. In this case the left side of the inequality becomes $$\binom{1}{M},$$

i.e., only applies of M=1 However, as discussed above, M=4 due to the two clusters of LTE multi-cluster allocation.

Since $s_0 < s_1$ and $$\binom{N-(s_0+1)}{M-1} \geq \binom{N-s_1}{M-1},$$

it follows that $$\binom{N-s_0}{M} \geq \binom{N-s_1}{M-1}.$$

The equality holds only if $s_1 = s_0+1$. Consequently, it holds that $$\binom{N-s_0}{M} > \binom{N-s_1}{M-1}.$$

The same can be applied mutatis mutandis for the other terms, so that the following relations are obtained:

$$\binom{N-s_0}{M} > \binom{N-s_1}{M-1} > \binom{N-s_2}{M-2} > \binom{N-s_3}{M-3}.$$

It becomes therefore evident that $$\binom{N-s_0}{M} > \binom{N-s_1}{M-1} > \binom{N-s_2}{M-2} > \binom{N-s_3}{M-3}$$

applies, unless one of those terms equals zero. Specifically, the case that the first term is not the largest value can only occur if:

$$\binom{N-s_0}{M} = 0$$

$$\binom{N-s_1}{M-1} = 0$$

$$\binom{N-s_2}{M-2} = 0$$

$$\binom{N-s_3}{M-3} = 0$$

With $$\binom{x}{y} = 0 \quad x < y$$

and $M=4$, it can be concluded that:

$s_0 > N-4$ $s_1 > N-3$ $s_2 > N-2$ $s_3 > N-1$

With $1 \leq s_0 < s_1 < s_2 < s_3 \leq N$, it further holds that:

$s_0 \leq N-3$ $s_1 \leq N-2$ $s_2 \leq N-1$ $s_3 \leq N$

When combining these two constraints, the inequality holds only in the following condition:

$s_0 = N-3$ $s_1 = N-2$ $s_2 = N-1$ $s_3 = N$

To determine the largest value of r, it is sufficient to consider those cases where each term is non-zero. Then, in this specific case, r can be expressed as:

$$r = \binom{N-s_0}{4} + \binom{N-s_1}{3} + \binom{N-s_2}{2} + \binom{N-s_3}{1}.$$

Each term becomes largest if the $N-s_n$ term is as large as possible, i.e., in the following case:

$$r_{max} = \binom{N-1}{4} + \binom{N-2}{3} + \binom{N-3}{2} + \binom{N-4}{1}$$

The following formula can further be applied:

$$\binom{N}{4} = \binom{N-1}{4} + \binom{N-1}{3}$$

$$\binom{N}{4} = \binom{N-1}{4} + \binom{N-2}{3} + \binom{N-2}{2}$$

$$\binom{N}{4} = \binom{N-1}{4} + \binom{N-2}{3} + \binom{N-3}{2} + \binom{N-3}{1}$$

$$\binom{N}{4} = \binom{N-1}{4} + \binom{N-2}{3} + \binom{N-3}{2} + \binom{N-4}{1} + \binom{N-4}{0}$$

$$\binom{N}{4} = \binom{N-1}{4} + \binom{N-2}{3} + \binom{N-3}{2} + \binom{N-4}{1} + 1$$

$$\binom{N-1}{4} + \binom{N-2}{3} + \binom{N-3}{2} + \binom{N-4}{1} = \binom{N}{4} - 1.$$

Moreover, for the maximum value of r that can result for the supported resource allocations, $$r_{max} = \binom{N}{4} - 1 \text{ applies.}$$

Furthermore, the largest values of r are obtained when $$\binom{N-s_0}{M}$$

is largest, i.e., for $s_0 = 1$.

In LTE(-A), the edge PRBs (physical resource blocks) are likely used, configured, reserved or occupied for PUCCH (physical uplink control channel) transmissions. Therefore, the likelihood of assigning the edge PRBs (at both sides of the spectrum) is quite low. It follows that the probability that these edge PRBs (for example all RBGs that contain the edge PRBs) are allocated in a multi-cluster allocation is comparably low. Furthermore, not using edge PRBs reduces the out-of-band emissions generated by transmissions, so is advantageous even if those PRBs are not used configured, reserved or occupied for PUCCH transmissions.

The largest signaled values for multi-cluster allocations occur when the start of the first cluster is in RBG 1, i.e., in the first RBG of the uplink bandwidth. The smallest signaled values for multi-cluster allocations cannot be so easily predicted.

For example, if the uplink system bandwidth is 7 PRBs, the following values apply:

$$N_{RB}^{UL} = 7$$
$$P = 1$$
$$N_{RBG}^{UL} = 7$$
$$N = 8$$
$$1 \leq s_0 < s_1 < s_2 < s_3 \leq 8$$
$$r = \binom{8-s_0}{4} + \binom{8-s_1}{3} + \binom{8-s_2}{2} + \binom{8-s_3}{1}$$
$$r_{max} = \binom{8}{4} - 1 = 69.$$

Consequently, for the example that the uplink system bandwidth is 7 PRBs, seventy different values r exist (0 to 69). These different values of r are the allowed uplink resource allocations supported by the system. To represent seventy allowed values, 7 bits are required.

For these parameters of the exemplary system bandwidth of 7 PRBs, the equation $$\lceil \log_2(N_{RB}^{UL}(N_{RB}^{UL}+1)/2) \rceil + 1 = \lceil \log_2(7 \cdot 8/2) \rceil + 1 = \lceil \log_2(28) \rceil + 1 = 6$$

provides that only 6 bits are available for the signaling of r, even though 7 bits would be required to cover all seventy allowed r values. The seventy allowed values and the corresponding RBG multi-cluster allocations of this example are shown in Table 2.

It can further be observed from Table 2 that the values 64-69 (shown in italics) have in common that the first RBG $s_0$ of the first cluster is RBG number 1, i.e., the first RBG of the system bandwidth. These states therefore correspond to those valid states where the MSB (i.e., the bit representing decimal 64) of r is set to 1. On the other hand, it can be observed that the states that are represented by the LSB of r set to 0 (shown in bold) share no similar characteristic, for example they do not share any identical starting or ending RBG of either cluster.

TABLE 2

| $s_0$ | $s_1$ | $s_2$ | $s_3$ | r |
|---|---|---|---|---|
| *1* | *2* | *3* | *4* | *69* |
| *1* | *2* | *3* | *5* | 68 |
| *1* | *2* | *3* | *6* | *67* |
| *1* | *2* | *3* | *7* | 66 |
| *1* | *2* | *3* | *8* | *65* |
| *1* | *2* | *4* | *5* | 64 |

TABLE 2-continued

| $s_0$ | $s_1$ | $s_2$ | $s_3$ | r |
|---|---|---|---|---|
| 1 | 2 | 4 | 6 | 63 |
| 1 | 2 | 4 | 7 | 62 |
| 1 | 2 | 4 | 8 | 61 |
| 1 | 2 | 5 | 6 | 60 |
| 1 | 2 | 5 | 7 | 59 |
| 1 | 2 | 5 | 8 | 58 |
| 1 | 2 | 6 | 7 | 57 |
| 1 | 2 | 6 | 8 | 56 |
| 1 | 2 | 7 | 8 | 55 |
| 1 | 3 | 4 | 5 | 54 |
| 1 | 3 | 4 | 6 | 53 |
| 1 | 3 | 4 | 7 | 52 |
| 1 | 3 | 4 | 8 | 51 |
| 1 | 3 | 5 | 6 | 50 |
| 1 | 3 | 5 | 7 | 49 |
| 1 | 3 | 5 | 8 | 48 |
| 1 | 3 | 6 | 7 | 47 |
| 1 | 3 | 6 | 8 | 46 |
| 1 | 3 | 7 | 8 | 45 |
| 1 | 4 | 5 | 6 | 44 |
| 1 | 4 | 5 | 7 | 43 |
| 1 | 4 | 5 | 8 | 42 |
| 1 | 4 | 6 | 7 | 41 |
| 1 | 4 | 6 | 8 | 40 |
| 1 | 4 | 7 | 8 | 39 |
| 1 | 5 | 6 | 7 | 38 |
| 1 | 5 | 6 | 8 | 37 |
| 1 | 5 | 7 | 8 | 36 |
| 1 | 6 | 7 | 8 | 35 |
| 2 | 3 | 4 | 5 | 34 |
| 2 | 3 | 4 | 6 | 33 |
| 2 | 3 | 4 | 7 | 32 |
| 2 | 3 | 4 | 8 | 31 |
| 2 | 3 | 5 | 6 | 30 |
| 2 | 3 | 5 | 7 | 29 |
| 2 | 3 | 5 | 8 | 28 |
| 2 | 3 | 6 | 7 | 27 |
| 2 | 3 | 6 | 8 | 26 |
| 2 | 3 | 7 | 8 | 25 |
| 2 | 4 | 5 | 6 | 24 |
| 2 | 4 | 5 | 7 | 23 |
| 2 | 4 | 5 | 8 | 22 |
| 2 | 4 | 6 | 7 | 21 |
| 2 | 4 | 6 | 8 | 20 |
| 2 | 4 | 7 | 8 | 19 |
| 2 | 5 | 6 | 7 | 18 |
| 2 | 5 | 6 | 8 | 17 |
| 2 | 5 | 7 | 8 | 16 |
| 2 | 6 | 7 | 8 | 15 |
| 3 | 4 | 5 | 6 | 14 |
| 3 | 4 | 5 | 7 | 13 |
| 3 | 4 | 5 | 8 | 12 |
| 3 | 4 | 6 | 7 | 11 |
| 3 | 4 | 6 | 8 | 10 |
| 3 | 4 | 7 | 8 | 9 |
| 3 | 5 | 6 | 7 | 8 |
| 3 | 5 | 6 | 8 | 7 |
| 3 | 5 | 7 | 8 | 6 |
| 3 | 6 | 7 | 8 | 5 |
| 4 | 5 | 6 | 7 | 4 |
| 4 | 5 | 6 | 8 | 3 |
| 4 | 5 | 7 | 8 | 2 |
| 4 | 6 | 7 | 8 | 1 |
| 5 | 6 | 7 | 8 | 0 |

According to an embodiment of the invention, the following approach is used if insufficient bits are available to signal the whole range of r as with the above example listed in Table 2:

The bits that can be signaled represent the LSBs of r

Any "remaining" bits of r that cannot be signaled, i.e., the "remaining" MSB(s) of r (if any), are set to 0.

According to another embodiment of the invention, it is further proposed that:

The eNodeB, when determining the multi-cluster allocation, avoids assigning multi-cluster allocations that cannot be transmitted in the DCI. In other words, only those allocations are determined for which the MSB(s), where applicable, are 0. In this case, there is no need to inform the UE of the value of the MSB(s), as it assumes them to be zero according to this invention. Alternatively, the UE can be informed of the value of the MSB(s), for example as part of control information signaled to the UE.

The following advantages are obtained for these embodiments:

Multi-cluster allocations can be supported for all values of the system bandwidth $N_{RB}^{UL}$, even if insufficient bits are available to signal the unrestricted range of values of r Only allocations where the first RBG of the allocation is on the first RBG of the uplink system bandwidth cannot be realized. However, it is expected that the first RBG is typically not assigned due to the aspects mentioned above, so that the relative loss to the system is comparably negligible.

Some allocations where the first RBG of the allocation is on the first RBG of the uplink system bandwidth can still be realized (for example by signaling values of r between 35 and 63):

In contrast, if for example the MSB was set to 1, only allocations 64-69 could be signaled, which is a comparatively strong restriction to the usability of multi-cluster resource allocation.

In contrast, if for example the LSB was set to either 0 or 1, only 35 out of the above 70 cases of Table 2 could be signaled, which is also putting strong restrictions on the usability of multi-cluster resource allocation. Moreover, these allocations do not follow a particular pattern.

In contrast, if only an a priori defined restricted part of the bandwidth can be addressed by multi-cluster allocations, it follows that for example the first RBG can never be assigned for multi-cluster allocations. In the example of Table 2, this would affect configurations 35-69 that would not be usable, i.e., 50% of the cases.

According to another embodiment of the invention the same approach as outlined above is applied, i.e., to set the non-signaled MSB bits to zero. However, in addition the interpretation of the signaled values is modified. For example, the last RBG can be blocked from being assignable instead of the first RBG as in the above example. This approach is a mirroring of the signaled allocations and can be achieved by a re-mapping of the signaled information, such as the signaled values $s_0$ to $s_3$ denoting the two clusters of RBGs for LTE multi-cluster allocation. The re-mapping can be achieved according to a further embodiment of the invention by the following equations:

$$s_0^{applied} = N+1-s_3^{signalled}$$

$$s_1^{applied} = N+1-s_2^{signalled}$$

$$s_2^{applied} = N+1-s_1^{signalled}$$

$$s_3^{applied} = N+1-s_0^{signalled}$$

According to still another embodiment, the mirroring can be also obtained by defining a re-interpretation of the r values. For the above example of Table 3, Table 4 shows possible relations, which are obtained from the above rules for re-interpreting the values $s_0$ to $s_3$ and the rule for obtaining an r-value from the values $s_0$ to $s_3$ discussed above.

TABLE 4

| $r^{signalled}$ | $r^{applied}$ |
|---|---|
| 69 | 0 |
| 68 | 1 |
| 67 | 5 |
| 66 | 15 |
| 65 | 35 |
| 64 | 2 |
| 63 | 6 |
| 62 | 16 |
| 61 | 36 |
| 60 | 9 |
| 59 | 19 |
| 58 | 39 |
| 57 | 25 |
| 56 | 45 |
| 55 | 55 |
| 54 | 3 |
| 53 | 7 |
| 52 | 17 |
| 51 | 37 |
| 50 | 10 |
| 49 | 20 |
| 48 | 40 |
| 47 | 26 |
| 46 | 46 |
| 45 | 56 |
| 44 | 12 |
| 43 | 22 |
| 42 | 42 |
| 41 | 28 |
| 40 | 48 |
| 39 | 58 |
| 38 | 31 |
| 37 | 51 |
| 36 | 61 |
| 35 | 65 |
| 34 | 4 |
| 33 | 8 |
| 32 | 18 |
| 31 | 38 |
| 30 | 11 |
| 29 | 21 |
| 28 | 41 |
| 27 | 27 |
| 26 | 47 |
| 25 | 57 |
| 24 | 13 |
| 23 | 23 |
| 22 | 43 |
| 21 | 29 |
| 20 | 49 |
| 19 | 59 |
| 18 | 32 |
| 17 | 52 |
| 16 | 62 |
| 15 | 66 |
| 14 | 14 |
| 13 | 24 |
| 12 | 44 |
| 11 | 30 |
| 10 | 50 |
| 9 | 60 |
| 8 | 33 |
| 7 | 53 |
| 6 | 63 |
| 5 | 67 |
| 4 | 34 |
| 3 | 54 |
| 2 | 64 |
| 1 | 68 |
| 0 | 69 |

This embodiment is particularly advantageous if for example the last RBG consists of fewer PRBs than the first RBG. For example, assuming that $N_{RB}^{UL}=85$, then the exemplary reinterpretation illustrated in Table 4 definition and a RBG size of P=4 (i.e., the RBG has 4 PRBs) one can determine that $N_{RBG}^{UL}=22$. Preferably, $N_{RBG}^{UL}-1=21$ RBGs are each set to a size of P=4 and the remaining $22^{nd}$ RBG is composed of only of 1 PRB. Generally, it is possible that either all RBGs will be of the same size P (if $N_{RB}^{UL}$ is an integer multiple of P), or $N_{RBG}^{UL}-1$ will be of size P and one "irregular" RBG will be of size in the range {1, 2, ..., P−1}. This occurs usually if $N_{RB}^{UL}$ is not an integer multiple of P.

It can be noted that the loss for the system is minimum if the "irregular" RBG cannot be assigned by multiple-cluster allocations. However, this loss applies to multi-cluster allocation only and the PRBs of the "irregular" RBG can still be assigned by single-cluster allocations, or by multi-cluster allocations that do not employ this re-interpretation, e.g., by other UEs.

Preferably, the "irregular" RBG is either the first or the last RBG. If it is the first RBG, the approach without re-interpretation is beneficial, while in the other case, the approach including the re-interpretation of the signaled value can be advantageously applied.

According to still another embodiment, the re-interpretation step can be applied by adding an offset to the signaled r-value, i.e., applying $r^{applied}=r^{signalled}+r^{offset}$. For example, $r^{offset}=r_{max}-r_{max}^{signalled}$ with $r_{max}^{signalled}$ as the maximum value that can be signaled with the available bits. Alternatively, $r_{max}^{signalled}$ can be configured by the eNodeB and/or signaled to the UE. The advantage of is the simplicity of an implementation.

As a simple (from implementation perspective) but not as effective alternative approach, the re-interpretation can consist of subtracting the signaled value from the maximum value $r^{applied}=r_{max}-r^{signalled}$, i.e., in the above example to use $r^{applied}=69-r^{signalled}$.

According to another embodiment of the invention, the re-interpretation to be applied could also be configured or signaled from the eNodeB. With such signaling, the flexibility of the possible assignments by eNodeB is increased, at the cost of more complex implementation at the UE side and possibly also at the transmitter side. In another aspect of this embodiment the re-interpretation behavior is configured by the base station for each UE individually and is signaled to same, e.g., using higher layer signaling such as RRC or MAC signaling in the context of LTE or LTE-A. For example, a first UE is configured without re-interpretation, while a second UE is configured with re-interpretation. Then, the first RBG can be allocated to the second UE and the last RBG can be allocated to the first UE in the same subframe using multi-cluster allocations each, so that all RBGs in the system can actually be utilized simultaneously from a system perspective.

In regard to the embodiments of the invention concerning the proposed re-interpretation aspects, DCI format 0 or DCI format 4 of 3GPP LTE(-A), for example Release 10, may be used. Both DCI formats concern multi-cluster allocation as discussed above.

Figure 7:
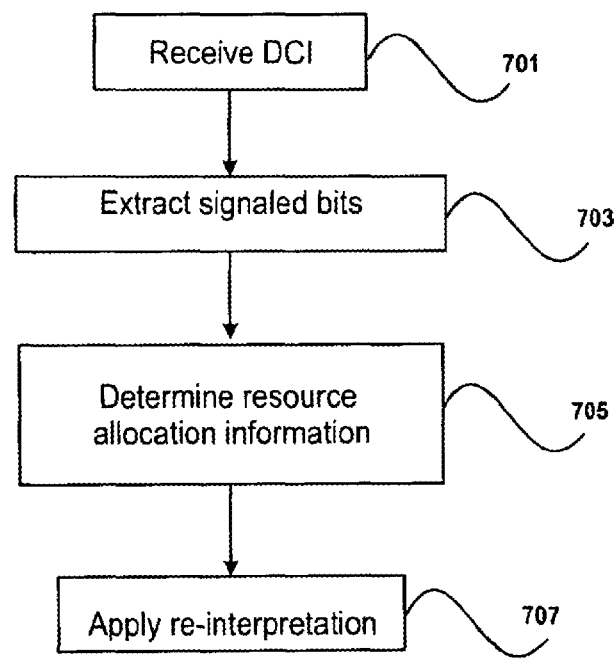
FIG. 7 shows an exemplary method for receiving and determining resource allocation information at a terminal of a mobile communication system according to one aspect of the present invention.

FIG. 7 shows an exemplary method for receiving and determining resource allocation information at a terminal of a mobile communication system as it can be used in regard to the discussed embodiments of the present invention.

The exemplary method of FIG. 7 can be performed by a terminal, such as a UE or a relay node in an LTE or UMTS system. The terminal receives control information that indicates allocated resources, such as allocated RBs or RBGs for uplink or downlink transmissions of the terminal. The allocated resources can be received as part of a DCI, as illustrated by step 701.

The terminal will then extract the bits of the signaled resource allocation information from the received control information, as shown by step 703. In case of LTE, the DCI includes dedicated fields and/or flags for indicating at least the allocated resources (i.e., RBs or RBGs), as discussed above. Typically, the received resource allocation information represents one or more bit-values that indicate the allocated resources to the terminal as discussed above.

The terminal determines in step 705 the allocated resource information from the received and extracted bits. As discussed above, steps 703 and 705 can be one and the same step, if the signaled information (e.g., the signaled bits in the resource allocation field of the DCI) specifies directly the allocated resource, as in prior systems discussed in the background section. According to embodiments of the invention, there could be insufficient bits available for signaling all allowed combinations of the allocated resources, in which case, the signaled bits received by the terminal do not directly indicate the allocated resource as discussed above. For some embodiments of the invention, non-signaled bits are set to a predefined value. In this case, the terminal can set these non-signaled bits according to the predefined scheme (that can be fixed at the terminal or signaled to the UE) as part of step 705 to result at the actual resource allocation information. Alternatively, the terminal is configured to interpret the received bits according to the predefined scheme to identify actual allocated resource without actively setting the non-signaled bits to a given value. In different embodiments of the invention, the signaled number of bits is sufficient to represent the allowed resource allocation and the steps 703 and 705 can be one step.

As an optional step 707, the terminal can apply a re-interpretation or re-mapping of the signaled and received resource allocations can be applied according to the discussed re-interpretation embodiments of the invention. As also discussed, the re-interpretation can be also signaled to the terminal, in which case an additional step of receiving and extracting an re-interpretation flag can be performed, either separately to or as part of steps 703 and 705.

Figure 7A:
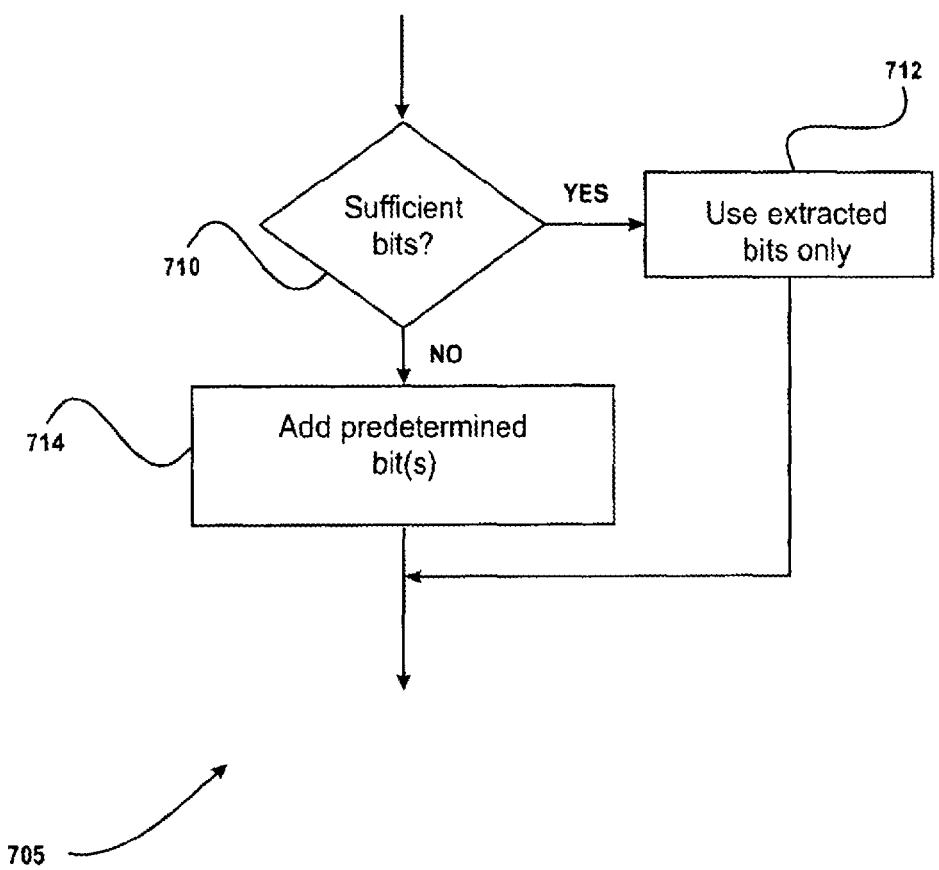
FIG. 7A shows exemplary steps of the determination of the resource allocation information of the exemplary method of FIG. 7 according to another embodiment of the present invention.

FIG. 7A shows exemplary steps that can be performed as part of the determining step 705 of FIG. 7 according to another embodiment of the present invention. As noted above, the terminal can determine the format and size of the received DCI, including the number (and location) of the bits used for signaling resource allocations. The number of signaled bits is also referred to as the "number of available bits" in the above description of the different aspects of the present invention. As it is also discussed above, the terminal is further able to determine the number of bits that is required to address or signal all allowed resource allocations that are supported by the communication system. As such, the terminal can determine whether the signaled bits (i.e., the number of bits in the received DCI that are extracted in step 703 of FIG. 7) is sufficient to represent all allowed resource allocations that are supported by the communication system, as illustrated in step 710 of FIG. 7A.

If the number of signaled bits is sufficient, the extracted bits of step 703 of FIG. 7 are determined to be the resource allocation information, as shown in step 712 of FIG. 7A.

If the number of signaled bits is insufficient, the extracted bits of step 703 of FIG. 7 are only one part of the resource allocation information. In this case, as shown by step 714, the predetermined one or more bits that are not signaled to the terminal (also referred to as the "remaining bit(s)" in the above description of the different aspects of the present invention) are then added to the signaled bits as extracted bits in step 703 of FIG. 7. As discussed above, the position and the value of the non-signaled bits that are to be added are predetermined. The result of combining the extracted bits and the predetermined non-signaled bits as illustrated in step 714 is then used as the resource allocation information. Thereafter, the re-interpretation step 707 of FIG. 7 can be performed using the result of either step 712 or step 714.

Figure 8:
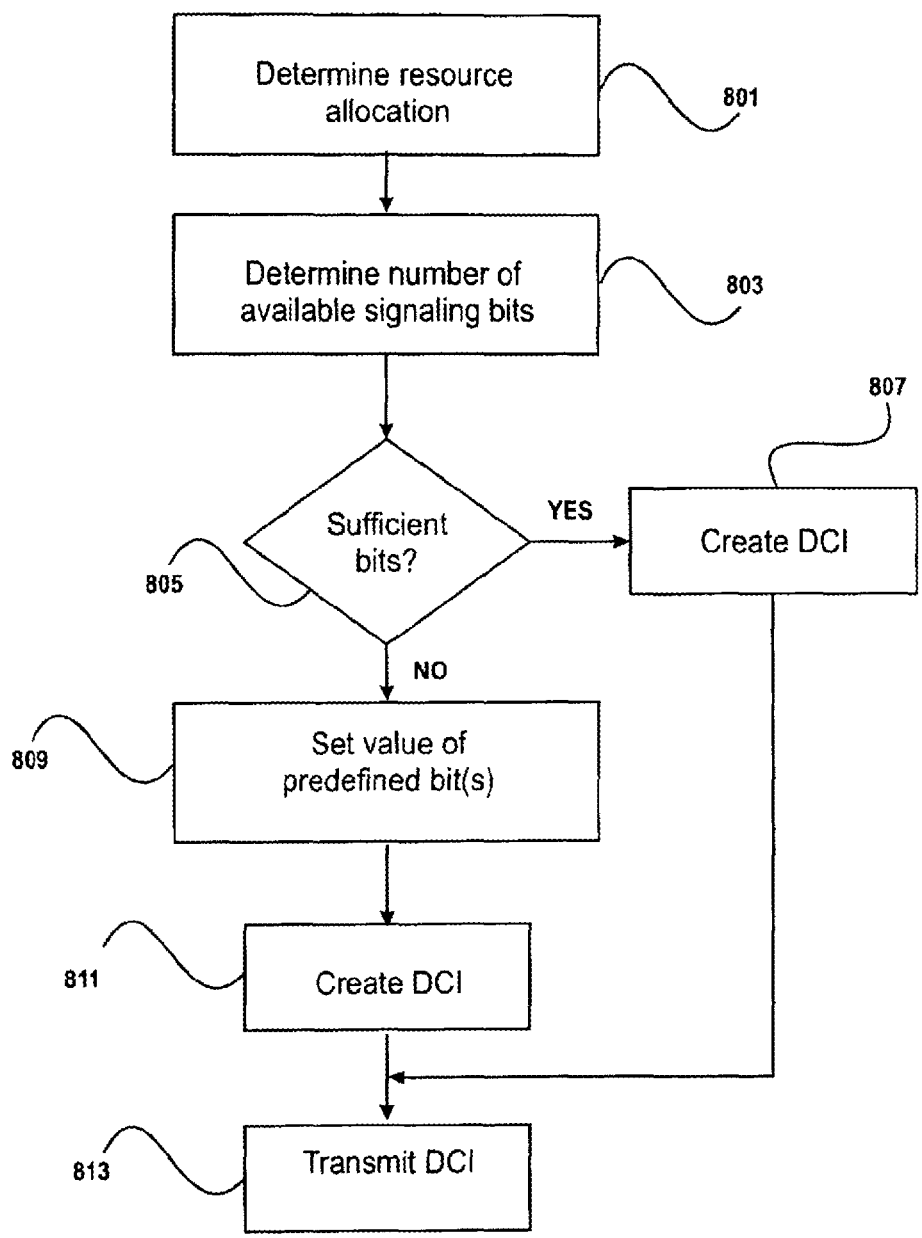
FIG. 8 shows an exemplary method for determining and transmitting resource allocation information by a base station of a mobile communication system according to one aspect of the present invention.

FIG. 8 shows an exemplary method for determining and transmitting resource allocation information by a base station of a mobile communication system as it can be used in regard to the discussed embodiments of the present invention.

The exemplary method of FIG. 8 can be performed a base station, such as an eNodeB/NodeB or a relay node in an LTE or UMTS system. The base station determines the assigned resources allocation for a terminal, such as allocated RBs or RBGs for uplink or downlink transmissions of the terminal, as illustrated by step 801.

According to step 803, the base station determines whether the number of available bits is sufficient for representing the allowed resource allocations supported by the system as discussed above for several embodiments of the invention.

If the number of available bits is sufficient, the base station can create the DCI in the common manner as illustrated by step 807.

If the number of available bits is insufficient, the base station can set one or more predetermined bits of the resource allocation information (i.e., the resource allocation information that would have to be signaled to address all allowed resource allocations supported by the system) to a predetermined value, as illustrated by step 809 and discussed above for several embodiments of the invention.

According to step 811, the base station creates the DCI with those bits to be signaled according to the respective embodiments of the invention.

Steps 803, 805 and 809 can be performed once by the base station or only under given circumstances, but not for each control information signaling step. The result can then be applied in multiple subsequent signaling steps and for creating and transmitting several DCIs to terminal(s) serviced by the base station. Alternatively, the numbers of bits and values determined can be predefined or fixed, in which case steps 803, 805 and 809 do not have to be performed by the base station. Moreover, some embodiments of the invention concern the case where there are sufficient bits available, such as the embodiments of the invention concerning the re-interpretation aspect that can be implemented with and without sufficient bits as discussed above. For these embodiments of the steps 803, 805 and 809 may not be performed by the base station.

Once the DCI is created, the base station can transmit the DCI to the terminal as illustrated in step 813.

The exemplary methods shown in FIGS. 7 and 8 can concern the same communication system in that the DCI received by the terminal in step 701 was transmitted by the base station in step 813.

Instead of setting the MSB(s) of the resource allocation information (e.g., the allocated RBGs) to 0 as discussed above, the bit(s) that are set and/or the value to which they are set can be configured by the eNodeB.

Whether a re-interpretation is applied or not can also be configured by the eNodeB, preferably per UE. According to another embodiment, the status whether re-interpretation is applied is signaled in the control information that carries the resource allocation. This could be achieved by a single bit (on/off). If this bit is taken from the LTE DCI resource allocation field according to the above example of Table 3, one additional MSB is set to zero. This means that with the earlier outlined example, instead of 6 available bits, 1 bit is used as a re-interpretation flag (on/off), while the remaining 5 bits denote the LSBs of r. Accordingly, the resources that can be assigned to an UE are limited to the values 0-31 of the Table 3. If the re-interpretation bit is set to "off", this means that states 0-31 from the table can be allocated. If the re-interpretation flag is "on", this means that states 0-31 can be signaled and a re-interpretation scheme is applied. According to another embodiment of the invention, the re-interpretation bit set to a first value means that a first set of states can be allocated by the available bits, and the re-interpretation bit set to a second value means that a second set of states can be allocated by the available bits. The first and second set of states can be configured and signaled by the base station.

As it has been discussed above, embodiments of the present invention allows to define (preferably per UE) which RBs or RBGs or combinations thereof can actually be addressed with the available number of bits if the signaling is insufficient to assign all allowed RB or RBG combinations in the multi-cluster approach.

However, according to yet another embodiment of the invention, the number of RBGs (e.g., for multi-cluster allocation) or the number of RBs (e.g., for single-cluster allocation) that can be addressed by an available number of bits can be determined and set by the system or the base station. For example, the number of addressable RBGs can be determined by:

$$N_{RBG}^{addressable} = \left\lfloor \frac{3}{2} + \sqrt{\frac{5}{4} + \sqrt{1 + 24 \cdot 2^{N_{bits,available}}}} \right\rfloor - 1$$

Thus, the signaled bits can be interpreted to define a multi-cluster allocation in the range from RBG 1 to RBG $N_{RB}^{addressable}$. Then, another parameter can be configurable which defines whether a re-interpretation is applied similar to the solutions outlined previously. Those skilled in the art will recognize that the given formula can also be applied to determine the number of addressable RBs by substituting $N_{RBG}^{addressable}$ by $N_{RB}^{addressable}$.

It is to be noted that this embodiment of the invention can be used to limit the assignable resource allocations for a UE, even if the available number of signaling bits would be sufficient to address all allowed resource allocations.

In addition, a re-interpretation can be defined such that the RB or RBG indices within the $N_{RB}^{UL}$ RBs are first configured. In case RBs are defined, those RBs are formed to RBGs, where generally non-adjacent RBs may be located in one RBG. The multi-cluster allocation signal is then used to assign RBGs from within this restricted set of RBGs. There is a choice whether the RBG size P is determined from the value $N_{RB}^{UL}$ or $N_{RBG}^{addressable}$. The first has the advantage that the RBG size is identical for all UEs under the eNodeB, which simplifies the scheduling algorithm due to only the single RBG size which has to be taken into account. On the other hand, with the second way the granularity of the addressable RBGs is improved, particularly if a very restricted subset of RBs is defined for possible multi-cluster allocations. For example, in a system with $N_{RB}^{UL}=50$ PRBs, the normal RBG size is P=3. The network could desire or decide to use only 16 out of those 50 PRBs (which for example corresponds to a frequency reuse factor of roughly ⅓ that is quite common in cellular communication systems). This means for the above mentioned first way that 6 RBGs, each of size 3 PRBs, are selected for multi-cluster allocation. For the above mentioned second way, there would be 8 RBGs of size 2 available for multi-cluster allocation, since for a system of 16 PRBs the RBG size is 2. Thus, the granularity and scheduling flexibility is increased. It can be noted that with the second way, it is possible that again more bits are required than available. However, in such a case, the present invention has proposed a solution to signal the allocations.

Since the number of bits required for multi-cluster allocations depends on $N_{RB}^{UL}$ as well as on the RBG size P (which is itself a function of $N_{RB}^{UL}$), it is also possible to modify the definition of the RBG size P so that the number of available bits is sufficient to hold the multi-cluster allocation for the resulting number of RBGs.

From the available number of bits for the multi-cluster allocation, the number of addressable RBGs can be determined by $$N_{RBG}^{addressable} = \left\lfloor \frac{3}{2} + \sqrt{\frac{5}{4} + \sqrt{1 + 24 \cdot 2^{N_{bits,available}}}} \right\rfloor - 1.$$

Therefore, the RBG size is determined from the number of uplink resource blocks and the number of addressable RBGs is determined by:

$$P_{RBG}^{UL} = \lceil N_{RB}^{UL} / N_{RBG}^{addressable} \rceil.$$

According to still another of the invention, it is therefore suggested to determining the RBG size for a given number of uplink resource blocks of a 3GPP LTE or 3GPP LTE-A communication system by Table 5 (derived using the above formula) instead of the suggested Table 2 of the 3GPP LTE specification discussed in the background section.

TABLE 5

| $N_{RB}^{UL}$ | $P_{RBG}^{UL}$ |
|---|---|
| ≤6, 8 | 1 |
| 7, 9-26 | 2 |
| 27-54 | 3 |
| 55-84, 91-100 | 4 |
| 85-90, 101-110 | 5 |

It can be seen that Table 5 determines the smallest possible RBG size $P_{RBG}^{UL}$ for which the number of bits is sufficient. Therefore, Table 5 provides the finest scheduler granularity and consequently the most effective allocation possibility in the scheduler (e.g., the NodeB) for all numbers of uplink resource blocks. However, from an implementation perspective it can be beneficial if the RBG size is a non-decreasing function of the number of uplink resource blocks. From that perspective, once the RBG size is a first value for a certain number of resource blocks, the RBG size should not be smaller than that first value for any larger number of resource blocks. Consequently, to take this into account, the Table 5 can be modified to resemble Table 6:

TABLE 6

| $N_{RB}^{UL}$ | $P_{RBG}^{UL}$ |
|---|---|
| ≤6 | 1 |
| 7-26 | 2 |

TABLE 6-continued

| $N_{RB}^{UL}$ | $P_{RBG}^{UL}$ |
|---|---|
| 27-54 | 3 |
| 55-84 | 4 |
| 85-110 | 5 |

Another aspect of the invention relates to the implementation of the described various embodiments using hardware and/or software. A skilled person will appreciate that the various embodiments of the invention can be implemented or performed using computing devices or one or more processors. A computing device or processor may for example be a general purpose processor, a digital signal processor (DSP), an application specific integrated circuit (ASIC), a field programmable gate array (FPGA) or other programmable logic devices, etc. The various embodiments of the invention may also be performed or embodied by a combination of these devices.

Further embodiments of the invention concern a terminal configured or adapted to perform the terminal-side steps of the different methods and functionalities of the above discussed embodiments.

Still further embodiments of the invention concern a base station configured or adapted to perform the base station-side steps of the different methods and functionalities of the above discussed embodiments.

Further, the various embodiments of the invention may also be implemented by means of software modules or computer-readable instructions stored on one or more computer-readable media, which when executed by a processor or device component, perform the described various embodiments of the invention. Likewise, any combination of software modules, computer-readable media and hardware components is anticipated by the invention. The software modules may be stored on any kind of computer readable storage media, for example RAM, EPROM, EEPROM, flash memory, registers, hard disks, CD-ROM, DVD, etc.

A person skilled in the art will appreciated that numerous variations and/or modifications may be made to the present invention as disclosed by the specific embodiments without departing from the spirit or scope of the invention as defined in the appended claims. The discussed embodiments are, therefore, to be considered in all respects to be illustrative and not restrictive.

The invention claimed is:

1. An integrated circuit comprising:
reception circuitry which, in operation, controls reception of downlink control information including a resource allocation field, the resource allocation field signaling resource allocation information that indicates resources allocated to a terminal apparatus; and
control circuitry coupled to the reception circuitry;
wherein when a plurality of clusters are allocated to the terminal apparatus and a number of available bits in the resource allocation field is smaller than a number of bits necessary to indicate the allocated plurality of clusters,
the reception circuitry receives a portion of the bits necessary to indicate the allocated plurality of clusters by the available bits in the resource allocation field; and
the control circuitry assumes remaining bit(s) of the bits necessary to indicate the allocated plurality of clusters to be of a defined value, and wherein when the number of available bits in the resource allocation field is equal to or larger than the number of bits necessary to indicate the allocated plurality of clusters,
  the reception circuitry receives the bits necessary to indicate the allocated plurality of clusters by the available bits in the resource allocation field; and
wherein the control circuitry, in operation, determines the resource allocation information based at least on the available bits in the resource allocation field included in the received downlink control information.

2. The integrated circuit s according to claim 1, wherein the portion of the bits necessary to indicate the allocated plurality of clusters are LSBs (Least Significant Bits) of the resource allocation information.

3. The integrated circuit according to claim 1, wherein the remaining bit(s) are MSBs (Most Significant Bits) of the resource allocation information, and the defined value is zero.

4. The integrated circuit according to claim 1, wherein the plurality of clusters are discontinuous on a frequency axis, each cluster including a plurality of resource blocks (RBs) which are continuous on the frequency axis.

5. The integrated circuit according to claim 1, wherein
  the plurality of clusters are allocated in units of resource block groups (RBGs); and
  the resource allocation information indicates a start RBG index and an end RBG index of each of the plurality of clusters.

6. The integrated circuit according to claim 1, wherein
  when one cluster is allocated, the resource allocation information is signaled using the available bits only; and
  the control circuitry determines the resource allocation information based on the available bits.

7. The integrated circuit according to claim 1, wherein the resource allocation information includes a hopping flag, which indicates whether frequency hopping is applied in case a single cluster is allocated, and resource block assignment information, which indicates resource blocks (RBs) forming the allocated plurality of clusters.

8. The integrated circuit according to claim 1, wherein the number of available bits is determined based on a system bandwidth.

9. The integrated circuit according to claim 1, wherein the control circuitry, in operation, prepares uplink data to be transmitted on uplink resources determined at least based on the available bits in the resource allocation field.

10. An integrated circuit comprising:
  reception circuitry which, in operation, controls reception of downlink control information including a resource allocation field, the resource allocation field signaling resource allocation information that indicates resources allocated to a terminal apparatus; and
  control circuitry coupled to the reception circuitry and, in operation, determines the resource allocation information based at least on the resource allocation field, wherein:
  when the reception circuitry receives, in the resource allocation field, less than all bits necessary to indicate clusters allocated to the terminal apparatus, the control circuitry assumes remaining bit(s) necessary to indicate the clusters allocated to the terminal apparatus to be of a defined value to determine the resource allocation information;
  when the reception circuitry receives, in the resource allocation field, all the bits necessary to indicate the clusters allocated to the terminal apparatus, the control circuitry determines the resource allocation information based on the resource allocation field.

11. The integrated circuit s according to claim 10, wherein the less than all the bits necessary to indicate the clusters allocated to the terminal apparatus are LSBs (Least Significant Bits) of the resource allocation information.

12. The integrated circuit according to claim 10, wherein the remaining bit(s) are MSBs (Most Significant Bits) of the resource allocation information, and the defined value is zero.

13. The integrated circuit according to claim 10, wherein the clusters are discontinuous on a frequency axis, each cluster including resource blocks (RBs) that are continuous on the frequency axis.

14. The integrated circuit according to claim 10, wherein
  the clusters are allocated in units of resource block groups (RBGs); and
  the resource allocation information indicates a start RBG index and an end RBG index of each of the clusters.

15. The integrated circuit according to claim 10, wherein, when one cluster is allocated to the terminal apparatus, the control circuitry determines the resource allocation information based only on the resource allocation field.

16. The integrated circuit according to claim 10, wherein the resource allocation information includes a hopping flag, which indicates whether frequency hopping is applied in case a single cluster is allocated, and resource block assignment information, which indicates resource blocks (RBs) forming the clusters allocated to the terminal apparatus.

17. The integrated circuit according to claim 10, wherein the control circuitry, in operation, determines uplink resources for transmitting uplink data based on the resource allocation information.

* * * * *